United States Patent
Zhang et al.

(10) Patent No.: US 12,189,904 B2
(45) Date of Patent: Jan. 7, 2025

(54) DISPLAY DEVICE

(71) Applicant: BOE Technology Group Co., Ltd., Beijing (CN)

(72) Inventors: Yangyang Zhang, Beijing (CN); Yongda Ma, Beijing (CN); Liping Lei, Beijing (CN); Honglei Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/245,525

(22) PCT Filed: Oct. 22, 2021

(86) PCT No.: PCT/CN2021/125516
§ 371 (c)(1),
(2) Date: Mar. 15, 2023

(87) PCT Pub. No.: WO2022/127363
PCT Pub. Date: Jun. 23, 2022

(65) Prior Publication Data
US 2023/0367426 A1  Nov. 16, 2023

(30) Foreign Application Priority Data

Dec. 15, 2020 (CN) .......................... 202011470265.X

(51) Int. Cl.
*G06F 3/042* (2006.01)
*G06F 3/04817* (2022.01)
*G06F 3/0486* (2013.01)
*G06F 3/0488* (2022.01)

(52) U.S. Cl.
CPC ........ *G06F 3/0421* (2013.01); *G06F 3/04817* (2013.01); *G06F 3/0486* (2013.01);
(Continued)

(58) Field of Classification Search
CPC .. G06F 3/0421; G06F 3/04817; G06F 3/0486; G06F 3/0488; G06F 2203/4104; G06F 2203/04107
See application file for complete search history.

(56) References Cited

U.S. PATENT DOCUMENTS

| 2010/0053118 A1 | 3/2010 | Chen |
| 2010/0238139 A1* | 9/2010 | Goertz ................. G06F 3/0425 345/175 |

(Continued)

FOREIGN PATENT DOCUMENTS

| CN | 202306510 U | 7/2012 |
| CN | 104407747 A | 3/2015 |

(Continued)

OTHER PUBLICATIONS

International Search Report and Written Opinion, mailed May 12, 2023, from PCT/CN2021/125516, 16 pages.

(Continued)

*Primary Examiner* — David Tung
(74) *Attorney, Agent, or Firm* — Workman Nydegger

(57) ABSTRACT

The embodiments of the present disclosure provide a display device, the display device comprising a display module and an infrared touch control assembly, wherein a display surface of the display module is in the shape of a rectangle with an edge extending in a first direction and an edge extending in a second direction, the first direction and the second direction being perpendicular to each other; the infrared touch control assembly comprises an infrared emitting frame and an infrared receiving frame which are arranged oppositely and extend in the first direction; a plurality of infrared emitting units are fixed in the infrared emitting frame; a plurality of infrared receiving units are fixed in the infrared receiving frame; and an orthographic projection of a light- (Continued)

emitting surface of the infrared emitting frame in the display module is positioned in an area outside a display area of the display module.

17 Claims, 12 Drawing Sheets

(52) U.S. Cl.
CPC .. *G06F 3/0488* (2013.01); *G06F 2203/04104* (2013.01); *G06F 2203/04107* (2013.01)

(56) References Cited

U.S. PATENT DOCUMENTS

| | | |
|---|---|---|
| 2016/0357335 A1 | 12/2016 | Yao |
| 2021/0124446 A1 | 4/2021 | Hu et al. |
| 2022/0180807 A1 | 6/2022 | Xu et al. |

FOREIGN PATENT DOCUMENTS

| | | |
|---|---|---|
| CN | 204229384 U | 3/2015 |
| CN | 110413150 A | 11/2019 |
| CN | 111026295 A | 4/2020 |
| CN | 111312788 A | 6/2020 |
| CN | 112230804 A | 1/2021 |

OTHER PUBLICATIONS

Chinese First Office Action, mailed Jan. 29, 2021, from China Pat. App. No. 202011470265.X, 12 pages.

\* cited by examiner

DISPLAY DEVICE

CROSS REFERENCE TO RELATED APPLICATIONS

The present application is a US National Stage of International Application No. PCT/CN2021/125516, filed on Oct. 22, 2021, which claims the priority of the Chinese patent application No. 202011470265.X filed with China National Intellectual Property Administration on Dec. 15, 2020, and entitled "Display Device", the entire content of which is incorporated herein by reference.

TECHNICAL FIELD

The disclosure relates to the technical field of display, in particular to a display device.

BACKGROUND

Currently, in a display device, a touch device is an important user interaction means, and a user may operate the display device by touching a display screen. In current mainstream display products, a capacitive touch device or infrared touch device is generally adopted. While, for a large-sized (such as 55 inches or more) display device, infrared touch control is a mainstream touch device implementation solution due to its cost advantage.

In order to realize a precise touch operation of the large-size display device, more infrared emitting sources and receiving sensors need to be set. Although the infrared touch product has the advantage of lower cost compared with the capacitive touch product, there is still a need to reduce the cost of the infrared touch display product.

SUMMARY

An embodiment of the disclosure provides a display device.

An embodiment of the disclosure provides a display device, including: a display module and an infrared touch assembly: where a display surface of the display module is in a shape of rectangle with an edge extending in a first direction and an edge extending in a second direction, and the first direction and the second direction are perpendicular to each other: the infrared touch assembly comprises an infrared emitting frame and an infrared receiving frame which are disposed oppositely and extend in the first direction, a plurality of infrared emitting units are fixed in the infrared emitting frame, and a plurality of infrared receiving units are fixed in the infrared receiving frame: an orthographic projection of a light-emitting surface of the infrared emitting frame in the display module is located in an area outside a display area of the display module; and a distribution density of the infrared emitting units in the infrared emitting frame is uneven.

In some embodiments, in the above display device provided by embodiments of the disclosure, the infrared touch assembly further comprises: an infrared emitting frame and an infrared receiving frame which are disposed oppositely and extend in the second direction.

In some embodiments, in the above display device provided by embodiments of the disclosure, the infrared emitting frame comprises a first area and a second area, and a distribution density of infrared emitting units in the first area is greater than a distribution density of infrared emitting units in the second area.

In some embodiments, in the above display device provided by embodiments of the disclosure, the first area is a middle area of the infrared emitting frame, and/or, the first area is an end edge area of the infrared emitting frame; and the second area is an area adjacent to the first area in the infrared emitting frame.

In some embodiments, in the above display device provided by embodiments of the disclosure, the N infrared emitting units with a sequence number from 1 to N are arranged in one infrared emitting frame, the first area is the middle area of the infrared emitting frame, and the n-m infrared emitting units with a sequence number from m to n are arranged in the first area at equal intervals; and N>n>m. A distance between the infrared emitting unit numbered m and the infrared emitting unit numbered 1 is a first distance: a distance between the infrared emitting unit numbered n and the infrared emitting unit numbered N is a second distance; and a distance between the infrared emitting unit numbered 1 and the infrared emitting unit numbered N is a third distance. A ratio between the first distance and the third distance is a first ratio, and the first ratio is greater than 0.35 and less than 0.5; and a ratio between the second distance and the third distance is a second ratio, and the second ratio is greater than 0.35 and less than 0.5.

In some embodiments, in the above display device provided by embodiments of the disclosure, the N infrared emitting units with a sequence number from 1 to N are arranged in one infrared emitting frame, the first area is the middle area of the infrared emitting frame, and the infrared emitting units with different intervals are arranged in the first area. A distance between the infrared emitting unit numbered 1 and the infrared emitting unit numbered N is a third distance; a distance between a center point between the two infrared emitting units with a minimum spacing in the first area and the infrared emitting unit numbered 1 is a fourth distance; and a ratio between the fourth distance and the third distance is a third ratio, and the third ratio is greater than 0.38 and less than 0.62.

In some embodiments, in the above display device provided by embodiments of the disclosure, a diameter of one infrared emitting unit is 0.4 mm-0.6 mm; and a spacing between the two adjacent infrared emitting units in the first area is 2 mm-7 mm; and a spacing between the two adjacent infrared emitting units in the second area is 5 mm-16 mm.

In some embodiments, in the above display device provided by embodiments of the disclosure, an effective infrared light signal emitted by the infrared emitting units in the first area of the infrared emitting frame extending in the first direction creates a first touch area at a surface of the display module: the display module displays at least one first icon on at least one display interface in an area corresponding to the first touch area; and the at least one infrared emitting unit is disposed within a range of an orthographic projection of the first icon in a direction parallel to a side edge where the first area is located.

In some embodiments, in the above display device provided by embodiments of the disclosure, an effective infrared light signal emitted by the infrared emitting units in the first area of the infrared emitting frame extending in the second direction creates a second touch area at a surface of the display module: there is a touch control overlapping area between the second touch area and the first touch area, and the display module displays the at least one first icon in an area corresponding to the touch control overlapping area; and the at least one infrared emitting unit is disposed within the range of the orthographic projection of the first icon in the direction parallel to the side edge where the first area is located.

In some embodiments, in the above display device provided by embodiments of the disclosure, the infrared emitting units and the infrared receiving units are in one-to-one correspondence, and the effective infrared light signal emitted by one infrared emitting unit is received by one infrared receiving unit, so as to realize a touch control function.

In some embodiments, in the above display device provided by embodiments of the disclosure, one infrared emitting unit corresponds to the plurality of infrared receiving units, and the effective infrared light signal emitted by one infrared emitting unit is simultaneously received by the plurality of corresponding infrared receiving units, so as to realize a touch control function. In some embodiments, in the above display device provided by embodiments of the disclosure, the display module includes a display panel and a protective cover plate: touch areas formed on a surface of the protective cover plate by effective infrared light signals emitted by all the infrared emitting units are divided into a third touch area and a fourth touch area, and touch control precision of the third touch area is higher than touch control precision of the fourth touch area; and the third touch area is located in a central area of the protective cover plate, and the fourth touch area is located in at least one edge area of the protective cover plate.

In some embodiments, in the above display device provided by embodiments of the disclosure, the third touch area covers a central area of the display area of the display module, and the fourth touch area covers at least one edge area of the display area of the display module.

In some embodiments, in the above display device provided by embodiments of the disclosure, the third touch area is at least partially located in the display area of the display module, and the protective cover plate is provided with a shielding layer in an area corresponding to the fourth touch area.

In some embodiments, in the above display device provided by embodiments of the disclosure, the display module displays at least one second icon on at least one display interface in an area corresponding to the fourth touch area; and a display position of the second icon corresponds to a position of the at least one infrared emitting unit or infrared receiving unit.

In some embodiments, in the above display device provided by embodiments of the disclosure, a geometric center of the second icon corresponds to a central position of the corresponding infrared emitting unit.

In some embodiments, in the above display device provided by embodiments of the disclosure, a geometric center of the second icon is positioned within an effective signal emitting angle range of the corresponding infrared emitting unit.

In some embodiments, in the above display device provided by embodiments of the disclosure, a distance b between the infrared emitting units and a boundary line separating the fourth touch area and the third touch area meets the following formula:

$$b \geq (a^* \tan \theta_1 ^* \tan \theta_2)/(\tan \theta_1 + \tan \theta_2);$$

where, a is a maximum spacing among the infrared emitting units, and $\theta_1$ and $\theta_2$ are respectively effective signal emitting angles of two adjacent infrared emitting units with the maximum spacing.

In some embodiments, in the above display device provided by embodiments of the disclosure, the display device is a multi-touch display device, and a distance b between the infrared emitting units and a boundary line separating the fourth touch area and the third touch area meets the following formula:

$$b \geq (c^* \tan \theta_3 ^* \tan \theta_4)/(\tan \theta_3 + \tan \theta_4);$$

where, a distance between the two infrared emitting units separated by one infrared emitting unit is a separation distance, c is a maximum separation distance among all the separation distances, and $\theta_3$ and $\theta_4$ are the effective signal emitting angles of the two infrared emitting units with the maximum separation distance respectively.

In some embodiments, in the above display device provided by embodiments of the disclosure, a diameter of one infrared emitting unit is 0.4 mm-0.6 mm; and a spacing between the two adjacent infrared emitting units is 1 mm-16 mm.

In some embodiments, the above display device provided by embodiments of the disclosure further includes: a processor, wherein the processor is configured to receive a command of a first operation from a user and control the display position of the second icon to move, and the display position of the second icon after movement corresponds to the position of at least one infrared emitting unit.

In some embodiments, in the above display device provided by embodiments of the disclosure, the third touch area is at least partially located in the display area of the display module, the third touch area includes a fifth touch area and a sixth touch area, touch control precision of the sixth touch area is lower than touch control precision of the fifth touch area, and the sixth touch area covers each corner area of the third touch area: the display module displays at least one third icon on at least one display interface in an area corresponding to the fifth touch area; and the display device further includes: a processor, wherein the processor is configured to receive a command of a second operation from a user and control a display position of the third icon to move in the display area following the second operation, and the display position of the third icon after movement is positioned within a range where the fifth touch area is located.

In some embodiments, in the above display device provided by embodiments of the disclosure, the processor is specifically configured to, in response to determining that the third icon moves to the sixth touch area when the user stops the second operation, control the display position of the third icon after movement to be positioned within the range where the fifth touch area is located.

In some embodiments, in the above display device provided by embodiments of the disclosure, an area with a high distribution density of the infrared emitting units forms a seventh touch area on a surface of the display module, and an area with a low distribution density of the infrared emitting units forms an eighth touch area on the surface of the display module; and when it is determined that a signal received by the infrared receiving units is to draw a local continuous line shape, an incremental change length of a displayed line segment in the eighth touch area is $\Delta L1$, an incremental change length of a displayed line segment in the seventh touch area is $\Delta L2$, and $\Delta L1 > \Delta L2$.

In some embodiments, in the above display device provided by embodiments of the disclosure, in the seventh touch area, one line segment growth is displayed every X1 frames of images, and a length of each growth is $\Delta L3$; and in the eighth touch area, one line segment growth is displayed every X2 frames of images, and a length of each growth is $(X2/X1)^*\Delta L3$, where X2 is greater than X1.

In some embodiments, in the above display device provided by embodiments of the disclosure, an effective feedback time interval of touch control data corresponding to the seventh touch area is T1, and a feedback time interval of touch control data corresponding to the eighth touch area is T2, where T1/T2 is positively correlated with $\Delta L1/\Delta L2$.

In some embodiments, in the above display device provided by embodiments of the disclosure the infrared touch assembly is positioned on one side of the display surface of the display module: or the infrared touch assembly is positioned on one side of the display module facing away from the display surface: or the infrared emitting frame in the infrared touch assembly is positioned on one side of the display surface of the display module, and the infrared receiving frame in the infrared touch assembly is positioned on one side of the display module facing away from the display surface: or the infrared receiving frame in the infrared touch assembly is positioned on one side of the display surface of the display module, and the infrared receiving frame in the infrared touch assembly is positioned on one side of the display module facing away from the display surface. In some embodiments, in the above display device provided by embodiments of the disclosure, the display module is a liquid crystal display panel, an organic light-emitting diode display panel or an electronic paper display panel.

In some aspects, an embodiment of the disclosure further provides another display device, including: a display module and an infrared touch assembly. The infrared touch assembly includes an infrared emitting frame and an infrared receiving frame, a plurality of infrared emitting units are fixed in the infrared emitting frame, and a plurality of infrared receiving units are fixed in the infrared receiving frame: one infrared emitting unit corresponds to the plurality of infrared receiving units, and an effective infrared light signal emitted by one infrared emitting unit is simultaneously received by the plurality of corresponding infrared receiving units: touch areas formed on a surface of the display module by effective infrared light signals emitted by all the infrared emitting units are divided into a third touch area and a fourth touch area, and touch control precision of the third touch area is higher than touch control precision of the fourth touch area; and the third touch area is located in a central area of the touch area, and the fourth touch area is located in at least one edge area of the touch area: the display module displays at least one second icon on at least one display interface in an area corresponding to the fourth touch area; and a display position of the second icon corresponds to a position of the at least one infrared emitting unit or infrared receiving unit.

In some embodiments, in the above display device provided by embodiments of the disclosure, a geometric center of the second icon corresponds to a central position of the corresponding infrared emitting unit.

In some embodiments, in the above display device provided by embodiments of the disclosure, a geometric center of the second icon is positioned within an effective signal emitting angle range of the corresponding infrared emitting unit.

In some embodiments, in the above display device provided by embodiments of the disclosure, a distance b between the infrared emitting units and a boundary line separating the fourth touch area and the third touch area meets the following formula:

$$b \geq (a*\tan\theta1*\tan\theta2)/(\tan\theta1+\tan\theta2);$$

where, a is a maximum spacing among the infrared emitting units, and θ1 and θ2 are respectively effective signal emitting angles of two adjacent infrared emitting units with the maximum spacing.

In some embodiments, in the above display device provided by embodiments of the disclosure, the display device is a multi-touch display device, and a distance b between the infrared emitting units and a boundary line separating the fourth touch area and the third touch area meets the following formula:

$$b \geq (c*\tan\theta3*\tan\theta4)/(\tan\theta3+\tan\theta4):$$

where, a distance between the two infrared emitting units separated by one infrared emitting unit is a separation distance, c is a maximum separation distance among all the separation distances, and θ3 and θ4 are effective signal emitting angles of the two infrared emitting units with the maximum separation distance respectively.

In some embodiments, in the above display device provided by embodiments of the disclosure, a diameter of one infrared emitting unit is 0.4 mm-0.6 mm; and a spacing between the two adjacent infrared emitting units is 1 mm-16 mm.

In some embodiments, the above display device provided by embodiments of the disclosure further includes: a processor, wherein the processor is configured to receive a first operation of a user and control the display position of the second icon to move, and the display position of the second icon after movement corresponds to the position of at least one infrared emitting unit.

In some embodiments, in the above display device provided by embodiments of the disclosure, the infrared touch assembly is positioned on one side of the display surface of the display module: or the infrared touch assembly is positioned on one side of the display module facing away from the display surface: or the infrared emitting frame in the infrared touch assembly is positioned on one side of the display surface of the display module, and the infrared receiving frame in the infrared touch assembly is positioned on one side of the display module facing away from the display surface: or the infrared receiving frame in the infrared touch assembly is positioned on one side of the display surface of the display module, and the infrared receiving frame in the infrared touch assembly is positioned on one side of the display module facing away from the display surface.

In some embodiments, in the above display device provided by embodiments of the disclosure, the display module is a liquid crystal display panel, an organic light-emitting diode display panel or an electronic paper display panel.

DETAILED DESCRIPTION

Figure 1A:
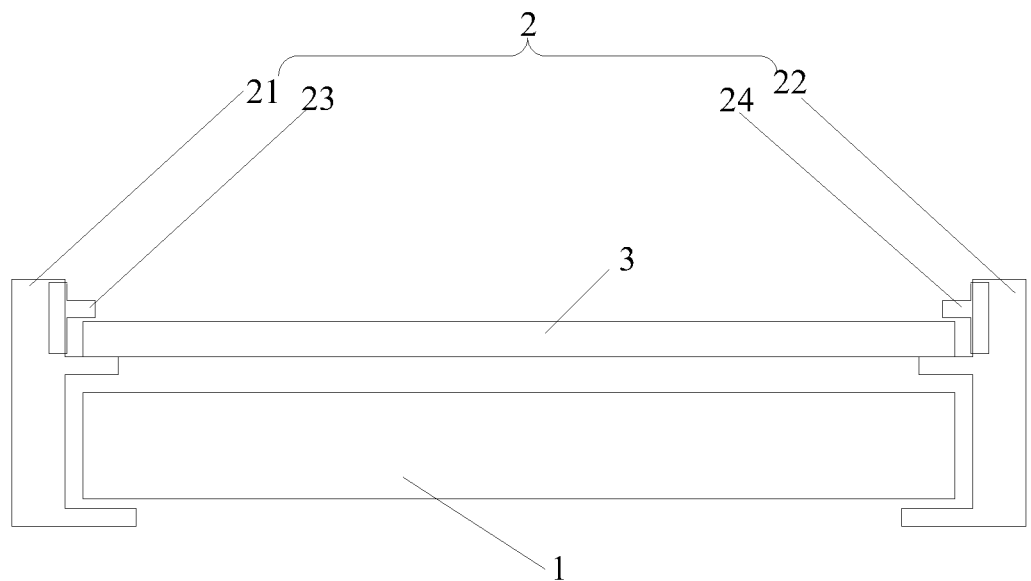
FIG. 1A is a schematic structural diagram illustrating a display device provided by an embodiment of the disclosure.

In order to make objectives, technical solutions and advantages of the present disclosure more clear, the present disclosure will be further described in detail below with reference to accompanying drawings. Obviously, the described embodiments are only part of the embodiments of the present disclosure, but not all the embodiments. On the basis of the embodiments in the disclosure, all other embodiments obtained by those ordinarily skilled in the art without inventive efforts fall within the protection scope of the present disclosure.

Shapes and sizes of all parts in the accompanying drawings do not reflect the true scale, and only intend to illustrate the content of the present disclosure.

A display device provided by an embodiment of the disclosure, as shown in FIG. 1A to FIG. 1D, includes a display module 1 and an infrared touch assembly 2.

The infrared touch assembly 2 includes an infrared emitting frame 21 and an infrared receiving frame 22, a plurality of infrared emitting units 23 are fixed in the infrared emitting frame 21, and the infrared emitting units 23 are used for emitting infrared light; and a plurality of infrared receiving units 24 are fixed in the infrared receiving frame 22, the infrared receiving units 24 are used for receiving infrared light, converting the received infrared light into a change of an electrical signal, such as change of a current I or a voltage U, and determining coordinates of a touch position after passing through a processor.

An orthographic projection of a light-emitting surface of the infrared emitting frame 21 in the display module 1 is located in an area outside a display area of the display module 1. The light-emitting surface of the infrared emitting frame 21 refers to a plane area constituted by positions where each infrared emitting unit 23 emits the infrared light at one side of the display area. Specifically, the infrared emitting frame 21 may be located in a frame area and an area outside the frame of the display module 1, which will not block the display area of the display module 1 and consequently affect normal display.

A distribution density of the infrared emitting units 23 is uneven in the infrared emitting frame 21.

Specifically, in a large-sized display device, not all areas in the display area of the display module 1 are sensitive areas for a display operation. Therefore, for an area with a low frequency of a touch operation, it is not necessary to set too many infrared emitting units 23 and infrared receiving units 24. But for an area where the touch operation may be frequent, for example, at least one or more application icons are displayed in this area, or a writing operation is required in this area, etc. . . . more infrared emitting units 23 and more infrared receiving units 24 may be set correspondingly, so as to realize a higher touch sensitivity. Based on this, in the display device provided by embodiments of the disclosure, the infrared emitting units 23 in the infrared emitting frame 21 may be in an uneven distribution, such that a conventional touch operation realized, a cost of the infrared touch assembly is reduced, and a cost of the display device is accordingly reduced.

In some embodiments, in the above display device provided by embodiments of the disclosure, the display module I may be a liquid crystal display panel (LCD), may also be an organic light-emitting diode display panel (OLED), and may further be an electronic paper display panel, which is not limited.

In some embodiments, in the above display device provided by embodiments of the disclosure, as shown in FIG. 1A, the infrared touch assembly 2 may be disposed on a side of the display surface of the display module 1, that is, the touch area formed by the infrared light emitted by the infrared emitting units 23 is applied to the display surface of the display module 1. Specifically, as shown in FIG. 1A, the infrared emitting units 23 and the infrared receiving units 24 may be disposed on a side of a protective cover plate 3 facing away from the display module 1, the infrared emitting units 23 emit the infrared light in a direction pointing to the corresponding infrared receiving units 24, and a user realizes the touch operation on an outer surface of the protective cover plate 3.

Figure 1B:
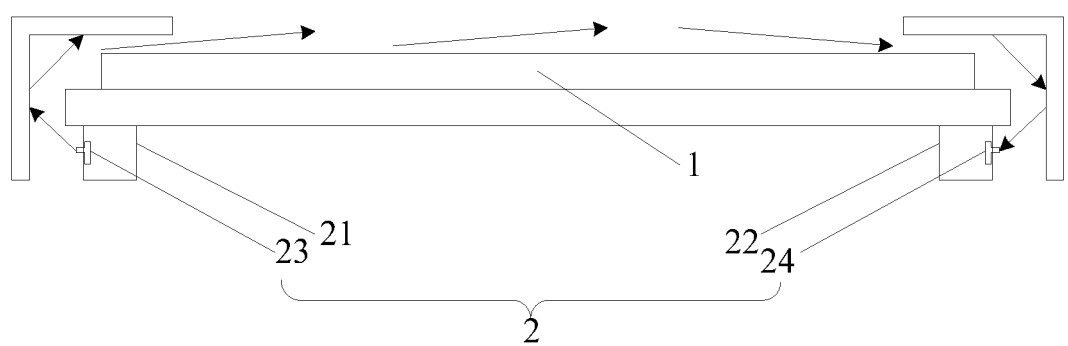
FIG. 1B is another schematic structural diagram illustrating a display device provided by an embodiment of the disclosure.

Or, in some embodiments, in the above display device provided by embodiments of the disclosure, as shown in FIG. 1B, the infrared touch assembly 2 may also be disposed on the side of the display module I facing away from the display surface, that is, the infrared light emitted by the infrared emitting units 23 is transmitted to the display surface of the display module 1 through reflection to form the touch area.

Figure 1C:
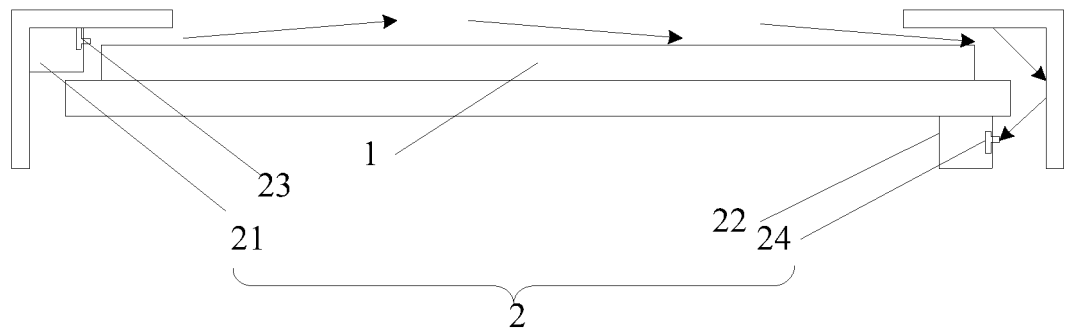
FIG. 1C is another schematic structural diagram illustrating a display device provided by an embodiment of the disclosure.
Figure 1D:
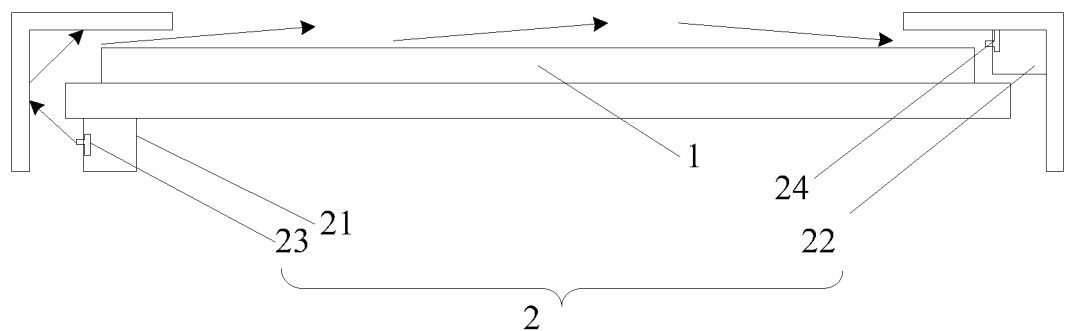
FIG. 1D is another schematic structural diagram illustrating a display device provided by an embodiment of the disclosure.

Or, in some embodiments, in the above display device provided by embodiments of the disclosure, the infrared touch assembly 2 may be partially disposed on the display surface of the display module 1, and the other part is disposed on the side of the display module I facing away from the display surface. For example, as shown in FIG. 1C, the infrared emitting frame 21 in the infrared touch assembly 2 may be disposed on the display surface of the display module 1, and the infrared receiving frame 22 in the infrared touch assembly 2 may be positioned on the side of the display module 1 facing away from the display surface. That is, the infrared light emitted by the infrared emitting units 23 is transmitted to a back surface of the display module 1 through reflection to be received by the infrared receiving units 24. Also as shown in FIG. 1D, the infrared emitting frame 21 in the infrared touch assembly 2 may be disposed on the side of the display module I facing away from the display surface, and the infrared receiving frame 22 in the infrared touch assembly 2 may be disposed on the display surface of the display module 1. That is, the infrared light emitted by the infrared emitting units 23 is transmitted to the display surface of the display module 1 through reflection to be received by the infrared receiving units 24. In some embodiments, in the above display device provided by embodiments of the disclosure, the display surface of the display module I is generally in a shape of a rectangle with an edge extending in a first direction and an edge extending in a second direction, and the first direction and the second direction are perpendicular to each other. The following descriptions are given by taking the first direction as a long side direction of the rectangle and the second direction as a short side direction of the rectangle as an example.

Figure 2:
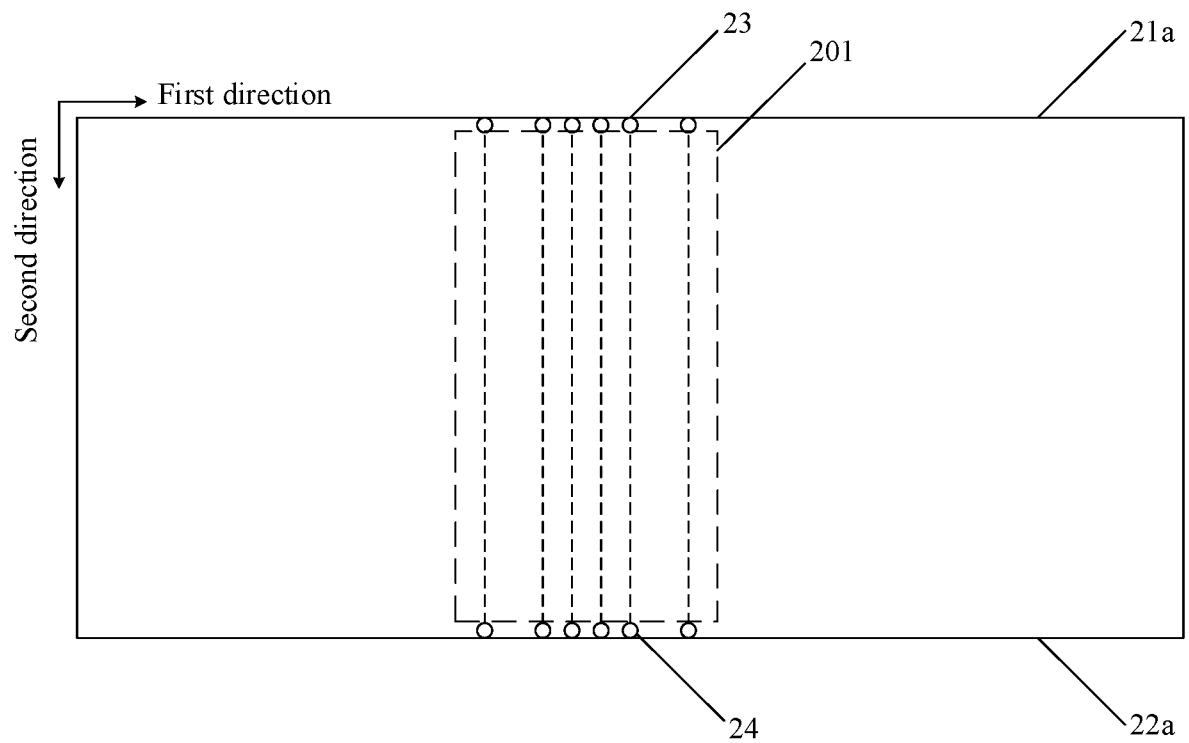
FIG. 2 is a schematic diagram illustrating a one-to-one corresponding relationship of touch control in a display device provided by an embodiment of the disclosure.

As shown in FIG. 2, the infrared emitting frame 21 may include: a first infrared emitting frame 21a extending in the first direction. Specifically, a light bar extending in the first direction may be used as the first infrared emitting frame 21a, and the plurality of infrared emitting units 23 (i.e., infrared lamp beads) on a PCB substrate form the light bar.

As shown in FIG. 2, the infrared receiving frame 22 may include: a first infrared receiving frame 22a arranged opposite to the first infrared emitting frame 21a and extending in the first direction.

Specifically, a distribution of the infrared emitting units 23 is uneven in the first infrared emitting frame 21a, and a distribution of the corresponding infrared receiving units 24 is also uneven in the first infrared receiving frame 22a. For the convenience of subsequent description, only the infrared emitting units 23 are described. Specifically, the uneven distribution of the infrared emitting units 23 in the first infrared emitting frame 21a specifically refers to that all the infrared emitting units 23 are sequentially arranged in the first infrared emitting frame 21a at intervals in the first direction, and an arrangement spacing between the infrared emitting units 23 is uneven.

Figure 3:
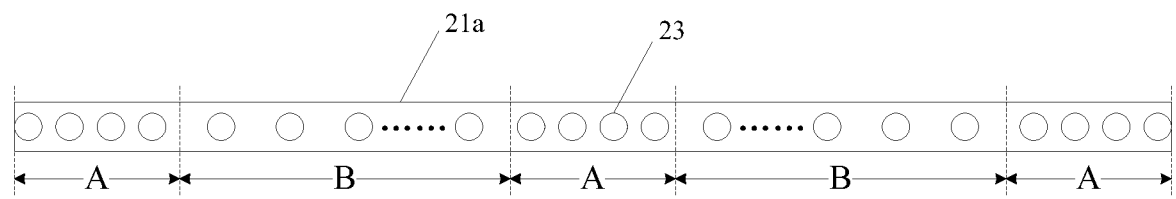
FIG. 3 is a schematic structural diagram illustrating a first infrared emitting frame in a display device provided by an embodiment of the disclosure.

In some embodiments, in the above display device provided by embodiments of the disclosure, as shown in FIG. 3, the first infrared emitting frame 21a includes a first area A and a second area B, and a distribution density of the infrared emitting units 23 in the first area A is greater than a distribution density of the infrared emitting units 23 in the second area B. It may be considered that a dense area where the infrared emitting units 23 are arranged in the first infrared emitting frame 21a is the first area A. The density of the infrared emitting units 23 in the first area A is greater than the density of the infrared emitting units 23 on the two adjacent sides. It may also be considered that a spacing between the adjacent infrared emitting units 23 in the first area A is smaller than a spacing between the infrared emitting units 23 in the second area B. FIG. 3 does not show all the infrared emitting units 23, but only shows three segments of infrared emitting unit sets, and each set includes a plurality of infrared emitting units 23.

In some embodiments, in the above display device provided by embodiments of the disclosure, the first area A may be a middle area of the first infrared emitting frame 21a, and the first area A may also be an end edge area of the first infrared emitting frame 21a. The second area B is an area adjacent to the first area A in the first infrared emitting frame 21a. FIG. 3 shows a situation that the first area A is in the middle area and the two-end edge areas of the first infrared emitting frame 21a, and the second area B is an area between the middle area and the two-end edge areas. Reducing the distribution density of the infrared emitting units 23 in the second area B, that is, reducing the quantity of the infrared emitting units 23 in the second area B, can save the cost.

In some embodiments, in the above display device provided by embodiments of the disclosure, the infrared emitting units 23 in the first area A may be arranged at equal or unequal spacing. For example, at an edge of the first area A, the spacing gradually becomes large so as to match the spacing in the second area B. Similarly, the infrared emitting units 23 in the second area B may be arranged at equal or unequal spacing, for example, at the edge of the second area B, the spacing is gradually reduced so as to match the spacing in the first area A.

Specifically, in the above display device provided by embodiments of the disclosure, a diameter of one infrared emitting unit 23 is generally 0.4 mm-0.6 mm, and a spacing between the two adjacent infrared emitting units is 1 mm-16 mm. Specifically, a spacing between the two adjacent infrared emitting units 23 in the first area A is generally 2 mm-7 mm, and a spacing between the two adjacent infrared emitting units 23 in the second area B is generally 5 mm-16 mm. It is worth noting that a cross-sectional shape of lamp beads of one infrared emitting unit 23 may be in a shape of a circle or a rectangle. When it is in the shape of the rectangle, the diameter of the infrared emitting units refers to a side length of the rectangle.

Preferably, in the above display device provided by embodiments of the disclosure, the first area A is only the middle area of the first infrared emitting frame 21a. Since relatively frequent touch is generally performed in the display area corresponding to the middle area of the first infrared emitting frame 21a, setting a high density of the infrared emitting units 23 in the middle area may improve touch precision to a certain extent.

The following describes a position of the middle area in the first infrared emitting frame 21a by using specific parameters.

All the N infrared emitting units 23 in the first infrared emitting frame 21a are numbered from 1 to N in a sequence from left to right.

If the infrared emitting units 23 are arranged at equal intervals in the middle area, the n-m infrared emitting units 23 in the middle area are numbered as m to n from left to right, here N>n>m. The infrared emitting unit 23 numbered m serves as a left side edge of the middle area, and a distance between the infrared emitting unit 23 numbered m and the infrared emitting unit 23 numbered 1 (i.e., the left side edge of the first infrared emitting frame 23a) is a first distance. The infrared emitting unit 23 numbered n serves as a right side edge of the middle area, and a distance between the infrared emitting unit 23 numbered n and the infrared emitting unit 23 numbered N (i.e., the right side edge of the first infrared emitting frame 23a) is a second distance. A distance between the infrared emitting unit 23 numbered 1 and the infrared emitting unit 23 numbered N (i.e., a length of the first infrared emitting frame 23a) is a third distance. A ratio between the first distance and the third distance is defined as a first ratio, the first ratio is greater than 0.35 and less than 0.5, a ratio between the second distance and the third distance is defined as a second ratio, and the second ratio is greater than 0.35 and less than 0.5.

If the infrared emitting units 23 in the middle area are arranged at unequal intervals, a distance between a center point between the two infrared emitting units 23 with a minimum spacing in the middle area and the infrared emitting unit 23 numbered 1 (i.e., the left side edge of the first infrared emitting frame 23a) is a fourth distance. A ratio between the fourth distance and the third distance is defined as a third ratio, and the third ratio is greater than 0.38 and less than 0.62.

It is worth noting that the spacing and the distance mentioned in the disclosure refer to a distance between the center points of the two infrared emitting units 23.

Specifically, when the display module I executes a display function, at least one first icon 210 is displayed on at least one user interface in the display area, and a preset program can be executed upon the first icon 210 being clicked by the user. For example, the first icon 210 may be an electronic whiteboard icon. When the user clicks the electronic whiteboard icon, the display module I starts an electronic whiteboard function, and the user may perform the writing operation on an electronic whiteboard interface. For another example, the first icon 210 may be a writing pen icon, an eraser icon, and a back icon on the electronic whiteboard interface. When the user clicks the icon, a writing pen function, an eraser function, and a back to previous function may be started correspondingly. For example, the first icon 210 may be a system setting icon, a Miracast icon, and the like, which is not limited.

Figure 4A:
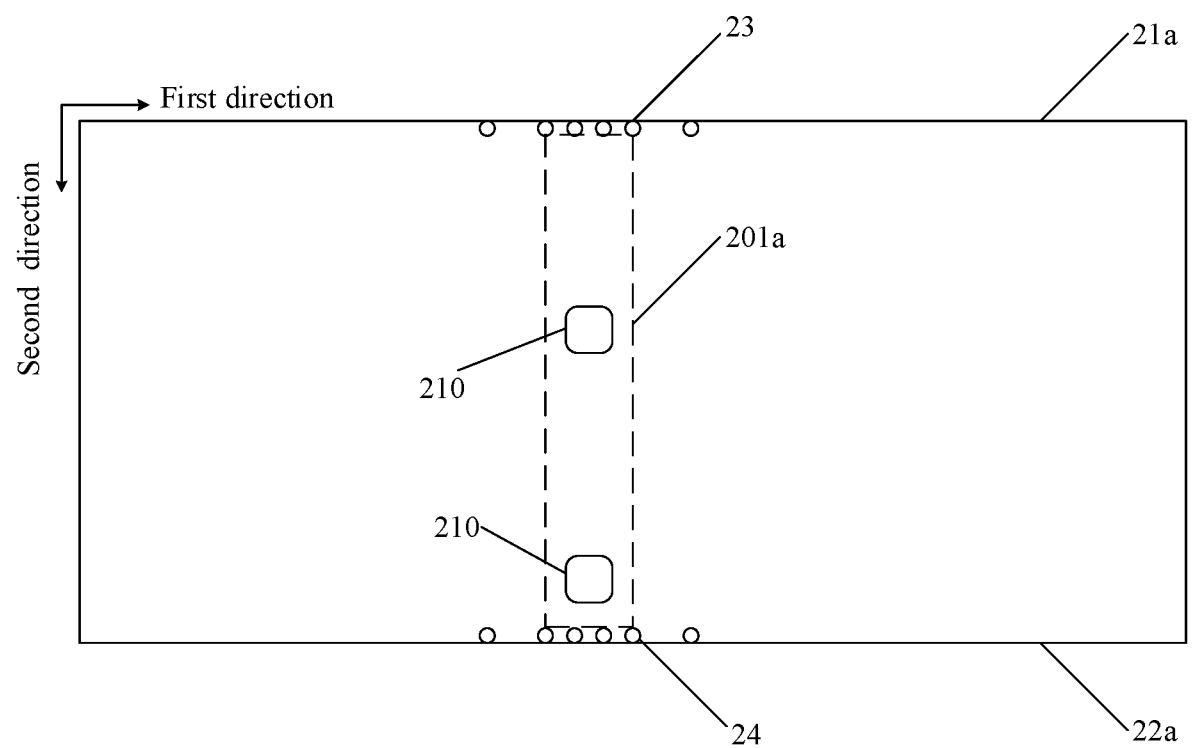
FIG. 4A is a schematic structural diagram illustrating a display device providing a first icon provided by an embodiment of the disclosure.

In some embodiments, in the above display device provided by embodiments of the disclosure as shown in FIG. 4A, an effective infrared light signal emitted by the infrared emitting units 23 in the first area A of the first infrared emitting frame 21a creates a first touch area 201a on a surface of the display module 1. At least one first icon 210 is presented on at least one display interface the display module 2 in an area corresponding to the first touch area 201a; and the at least one infrared emitting unit 23 is arranged within a range including an orthographic projection of the first icon 210 in a direction parallel to a side edge where the first area A is located.

Specifically, whether the first icon 210 is positioned upper or lower of the display interface are not specifically limited, and it may be located in the middle of the display interface, or may be positioned at the edge of the display interface. Since the first icon 210 is disposed in the area corresponding to the first touch area 201a, an accuracy and sensitivity of the user's click on the first icon 210 can be improved, and thus the user experience can be improved. Meanwhile, in other areas, namely, the second area B, the density of the infrared emitting units 23 may be appropriately reduced, that is, the number of the infrared emitting units 23 may be reduced, thereby saving the cost.

FIG. 4A only shows the embodiment of the infrared emitting units 23 arranged in the first infrared emitting frame 21a, namely, in the first direction (horizontal). Further, in a preferred embodiment, based on a mechanism of infrared touch control, in order to realize an accurate point touch operation, the infrared touch assembly 2 may further include: an infrared emitting frame 23 and an infrared receiving frame 24 disposed oppositely and extend in the second direction. That is, the infrared emitting units 23 and the infrared receiving units 24 are disposed in the second direction (vertical) as well.

Figure 4B:
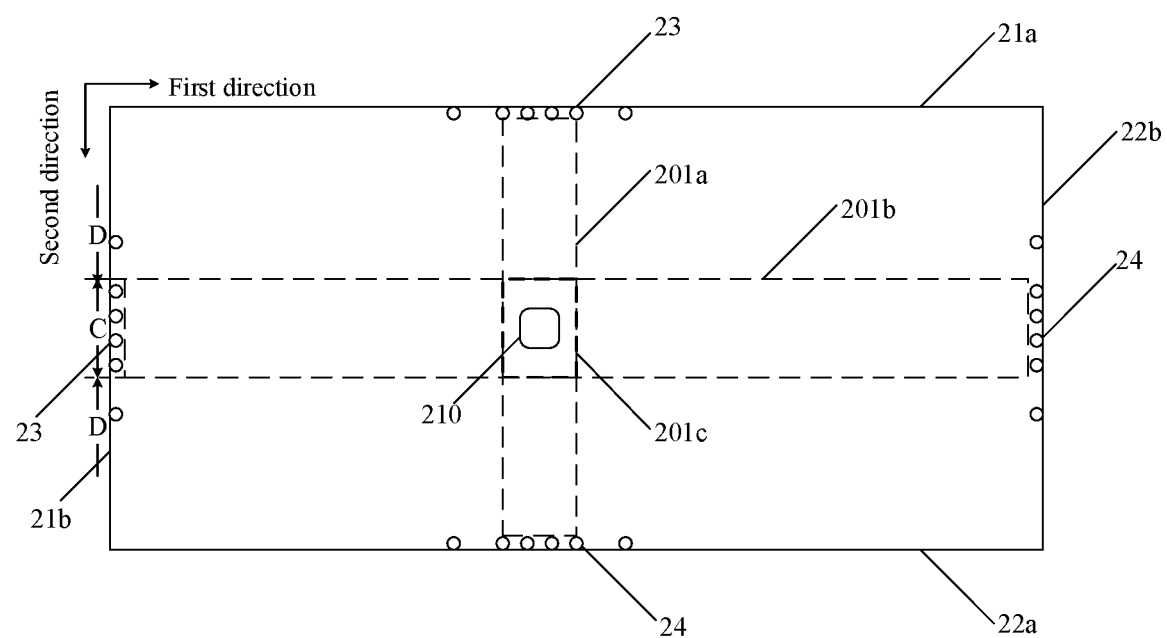
FIG. 4B is another schematic structural diagram illustrating a display device providing a first icon provided by an embodiment of the disclosure.

In some embodiments, in the above display device provided by embodiments of the disclosure, as shown in FIG. 4B, the infrared emitting frame 21 may further include: a second infrared emitting frame 21b extending in the second direction. Correspondingly, the infrared receiving frame 22 may further include: a second infrared receiving frame 22b disposed opposite to the second infrared emitting frame 21b and extending in the second direction, that is, the infrared emitting units 23 and the infrared receiving units 24 are disposed in the second direction as well.

Similar to the first infrared emitting frame 21a, the second infrared emitting frame 21b may include a first area A and a second area B, and a distribution density of the infrared emitting units 23 in the first area A is greater than a distribution density of the infrared emitting units 23 in the second area B. It may be considered that a dense area where the infrared emitting units 23 are arranged in the second infrared emitting frame 21b is the first area A. The density of the infrared emitting units 23 in the first area A is greater than the density of the infrared emitting units 23 adjacent at its upper and lower sides. It may also be considered that a spacing between the adjacent infrared emitting units 23 in the first area A is smaller than a spacing between the adjacent infrared emitting units 23 in the second area B. FIG. 4B does not show all the infrared emitting units 23, but only shows a set of a continuous segment of infrared emitting units 23.

Similarly, the first area A may be a middle area of the second infrared emitting frame 21b, and the first area A may also be an end edge area of the second infrared emitting frame 21b. The second area B is an area adjacent to the first area A in the second infrared emitting frame 21b. FIG. 4B shows a situation that the first area A is the middle area of the second infrared emitting frame 21b, and the second area B is an area adjacent to the middle area. Reducing the distribution density of the infrared emitting units 23 in the second area B, that is, reducing the quantity of the infrared emitting units 23 in the second area B, can save the cost.

Similarly, the infrared emitting units 23 in the first area A of the second infrared emitting frame 21b may be arranged at equal or unequal spacing. For example, at an edge of the first area A, the spacing gradually becomes large so as to match the spacing in the second area B. Similarly, the infrared emitting units 23 in the second area B may be arranged at equal or unequal spacing, for example, at the edge of the second area B, the spacing is gradually reduced so as to match the spacing in the first area A. A spacing between the two adjacent infrared emitting units 23 in the first area A of the second infrared emitting frame 21b is generally 2 mm-7 mm, and a spacing between the two adjacent infrared emitting units 23 in the second area B is generally 5 mm-16 mm.

Moreover, in the above display device provided by embodiments of the disclosure, the first area A is only the middle area of the second infrared emitting frame 21b. Since relatively frequent touch is generally performed in the display area corresponding to the middle area of the second infrared emitting frame 21b, setting a high density of the infrared emitting units 23 in the middle area may improve the touch control precision to a certain extent.

The manner in which specific parameters are used to describe the position of the middle area in the second infrared emitting frame 21b is similar to that of the above first infrared emitting frame 21a, which will not be described in detail here.

In some embodiments, as shown in FIG. 4B, an effective infrared light signal emitted by the infrared emitting units 23 in the first area A of the second infrared emitting frame 21b creates a second touch area 201b on the surface of the display module 1. There is a touch overlapping area 201c between the second touch area 201b and the first touch area 201a, and the display module 1 displays the at least one first icon 210 in an area corresponding to the touch overlapping area 201c; and the at least one infrared emitting unit 23 is disposed within a range including an orthographic projection of the first icon 210 in a direction parallel to a side edge where the first area A is located.

Specifically, there is the touch overlapping area 201c between the first touch area 201a in a horizontal direction and the second touch area 201b in a vertical direction. Since the first icon 210 is disposed in an area corresponding to the touch overlapping area 201c, an accuracy and sensitivity of the user's click on the first icon 210 can be improved, thereby improving the user experience.

Specifically, in the infrared touch assembly 2, the infrared light emitted by each infrared emitting unit 23 for realizing the touch operation and the infrared light received by each infrared receiving unit 24 for the user to realize the touch operation have a certain coverage scope.

In some embodiments, in the above display device provided by embodiments of the disclosure, as shown in FIG. 2, the infrared emitting units 23 and the infrared receiving units 24 may be in one-to-one correspondence, and the effective infrared light signal emitted by one infrared emitting unit 23 is received by one infrared receiving unit 24, so as to realize a touch control function. That is, according to an infrared touch control principle, the infrared emitting units 23 and the infrared receiving units 24 are in one-to-one correspondence in emission and reception of the effective infrared light signal, that is to say, as shown in FIG. 2, the effective infrared light signal emitted by one infrared emitting unit 23 can only be received by one infrared receiving unit 22. One or more pairs of infrared emitting units 23 and infrared receiving units 24 create a touch area 201.

Figure 5:
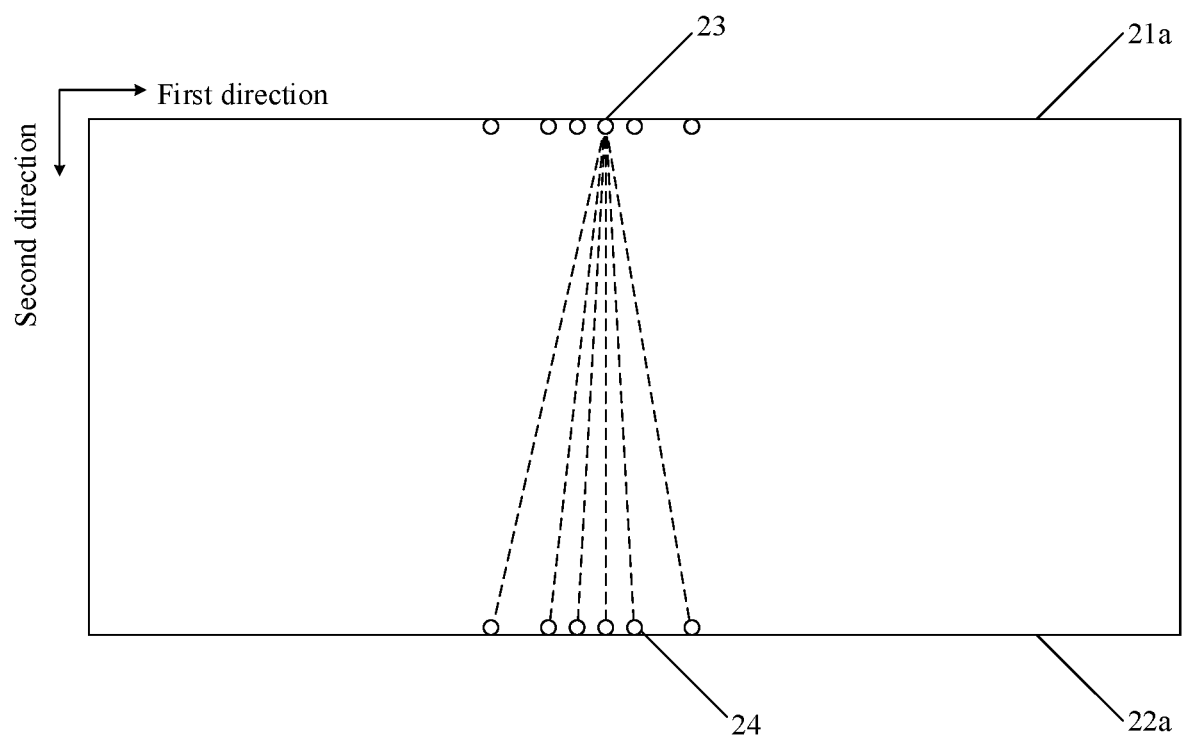
FIG. 5 is a schematic diagram illustrating a one-to-many corresponding relationship of touch control in a display device provided by an embodiment of the disclosure.

Specifically, the above implementation solution provided by embodiments of the disclosure is based on the mechanism of one-to-one correspondence between the infrared emitting units 23 and the infrared receiving units 24, and the effective infrared light signal emitted by one infrared emitting unit 23 can be received by one infrared receiving unit 24. An alternative to the infrared touch control mechanism is a one-to-many mechanism. That is, in some embodiments, in the above display device provided by embodiments of the disclosure, as shown in FIG. 5, one infrared emitting unit 23 may correspond to the plurality of infrared receiving units 24, and the infrared light emitted by one infrared emitting unit 23 may be simultaneously received by the plurality of corresponding infrared receiving units 24, so as to realize the touch control function. That is, the effective infrared light signal emitted by one infrared emitting unit 23 may be received by the plurality of infrared receiving units 24. Here, regardless of the mechanism, the above rules are still meet.

Figure 6:
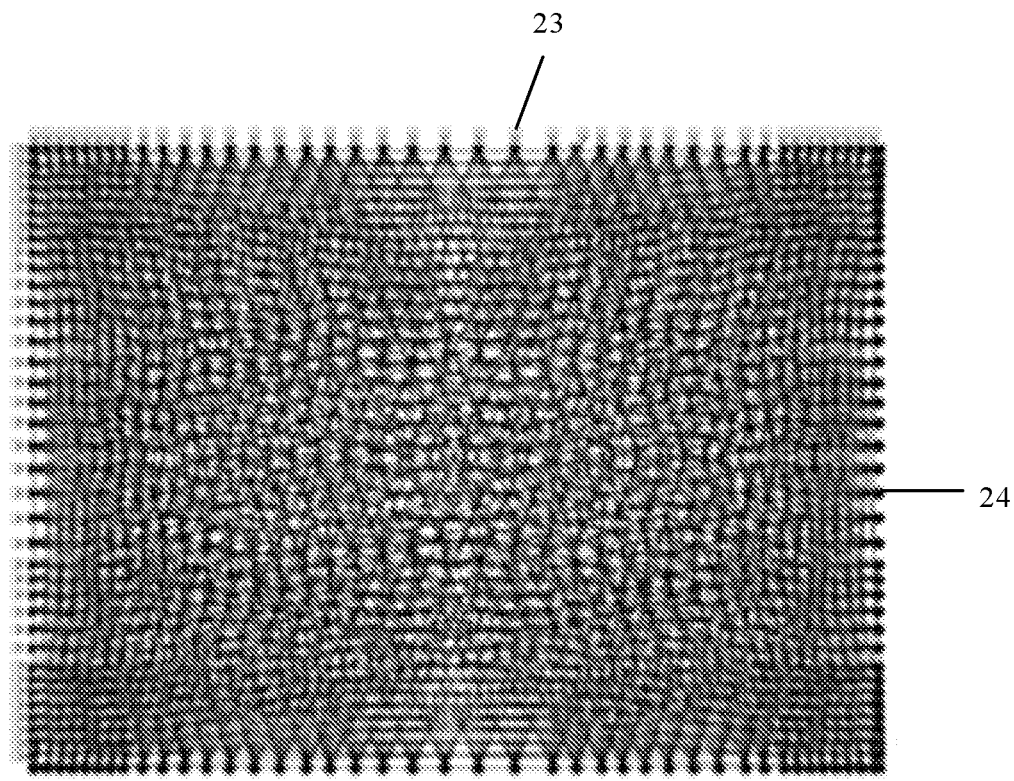
FIG. 6 is a schematic diagram illustrating a touch control optical network formed in a display device provided by an embodiment of the disclosure.

Specifically. FIG. 5 only shows a situation that the effective infrared light signal emitted by one infrared emitting unit 23 is received by the plurality of infrared receiving units 24, but in an actual product, the effective infrared light signal emitted by each infrared emitting unit 23 can be received by the plurality of infrared receiving units 24. Specifically. FIG. 5 only shows part of the infrared emitting units 23 and part of the infrared receiving units 24 arranged in the horizontal direction, namely: part of the infrared emitting units 23 arranged in the first infrared emitting frame 21a and part of the infrared receiving units 24 arranged in the first infrared receiving frame 22a. It should be noted that the actual product may further include more infrared emitting units 23 and part of the infrared receiving units 24 in the horizontal direction. Moreover, the infrared emitting units 23 and the infrared receiving units 24 may also be arranged in the vertical direction, that is, the infrared emitting units 23 are arranged in the second infrared emitting frame 21b and the infrared receiving units 24 are arranged in the second infrared receiving frame 22b. Therefore, all the infrared emitting units 23 and the infrared receiving units 24 may create an optical network for touch control, as shown in FIG. 6, so as to realize a multi-touch operation.

Compared with the one-to-one correspondence mechanism between the infrared emitting units 23 and the infrared receiving units 24, the above one-to-many mechanism can create a dense optical network, thus reducing the quantity of the infrared emitting units 23 and the infrared receiving units 24, thereby realizing an effect of reducing the product cost. However, the one-to-many mechanism also brings some defects, that is, a touch-insensitive area 501 is generated at an edge of the display device, which is introduced in detail below.

In a one-to-many touch control mode, each infrared emitting unit 23 has an effective signal emitting angle θ, and the effective signal emitting angle θ of one infrared emitting unit 23 refers to an included angle between an outermost detection beam emitted by the infrared emitting unit 23 and the normal. The effective signal emitting angle θ and an emitting angle of one infrared emitting unit 23 are not the same concept. For example, the emitting angle of one infrared emitting unit 23 is about 120 degrees, but the effective signal emitting angle θ is not that large. The emitting angle of the infrared emitting unit 23 gradually increases, and light intensity of the detection beam gradually decreases as well. With weakening of the light intensity, a large-angle area cannot be used for realizing infrared touch control due to a signal-to-noise ratio. Therefore, in a current touch control product, the effective signal emitting angle is generally controlled at a certain angle through timing or signal control. For example, in a one-to-seven infrared touch control mode, the effective infrared light signal emitted by one infrared emitting unit 23 can be received by the seven infrared receiving units 24, and light beams received at the left-most and right-most sides are the outermost detection beams. Because the spacing between the infrared emitting units 23 is inconsistent, for the different infrared emitting units 23, their effective signal emitting angles θ are not necessarily equal.

At present, the advanced infrared touch assembly 2 is generally multi-touch, so for detection of one touch point, in order to easily remove a ghost focus, at least three beams of light are generally required to pass through (the touch control point passed through the two beams of light is generally considered the ghost focus). For a display device with the infrared emitting units 23 in both horizontal and vertical directions, in order to ensure that the touch control function can be realized at the position of one point, the infrared emitting unit 23 in one direction provides at least one light beam, and the infrared emitting unit 23 in the other direction provides at least two light beams. Therefore, at the edge of the display device close to the infrared emitting units 23 and the infrared receiving units 24, it is generally impossible to realize continuous precise touch control. The area needs to be subjected to touch control shield. The area has many infrared touch control blind spots, so it may be called a touch control insensitive area (corresponding to a fourth touch area 402 in the disclosure).

Based on this, specifically, the display module may include a display panel and a protective cover plate. Touch areas generated on a surface of the protective cover plate by effective infrared light signals emitted by all the infrared emitting units may be divided into a third touch area 401 and a fourth touch area 402, and touch control precision of the third touch area 401 is higher than touch control precision of the fourth touch area 402; and the third touch area 401 is located in a central area of the protective cover plate, and the fourth touch area 402 is located in at least one edge area of the protective cover plate.

Figure 7A:
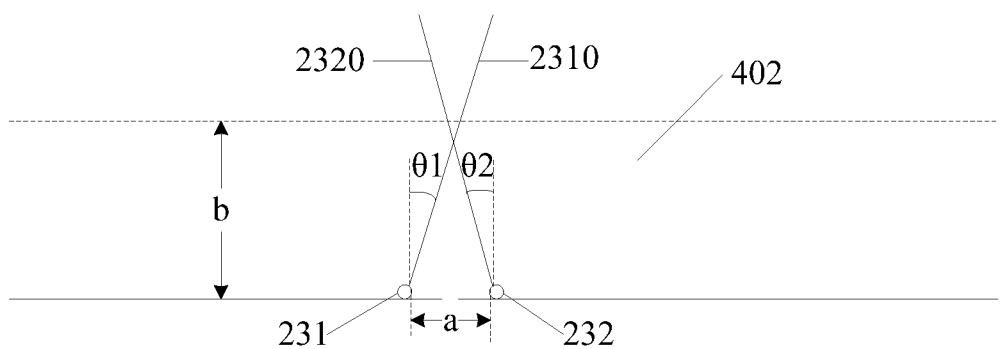
FIG. 7A is a schematic diagram illustrating a touch control insensitive area formed in a display device provided by an embodiment of the disclosure.

A distance b between the infrared emitting units 23 and a boundary line separating the fourth touch area 402 and the third touch area 401 (it is worth noting that when the infrared emitting units 23 are on one side of the display surface as shown in FIG. 1A and FIG. 1C, it may be considered that the infrared emitting units 23 and a boundary line are on the same horizontal plane, and the distance b is a straight-line distance between the boundary line and the infrared emitting units 23; and when the infrared emitting units 23 are on one side facing away from the display surface as shown in FIG. 1B and FIG. 1D, the distance b is a shortest distance from the infrared emitting units 23 to the boundary line through a broken line), as shown in FIG. 7A, meets the following:

$$b \geq (a * \tan \theta_1 * \tan \theta_2)/(\tan \theta_1 + \tan \theta_2).$$

As shown in FIG. 7A, the plurality of infrared emitting units 23 disposed horizontally include two adjacent infrared emitting units 231 and 232, and a spacing between the infrared emitting units 231 and 232 is a maximum spacing a among all the infrared emitting units 23. For the infrared emitting unit 231, an included angle between the outermost detection beam 2310 and the normal is an effective signal emitting angle $\theta_1$; and for the infrared emitting unit 232, an included angle between the outermost detection beam 2320 and the normal is an effective signal emitting angle $\theta_2$.

Figure 7B:
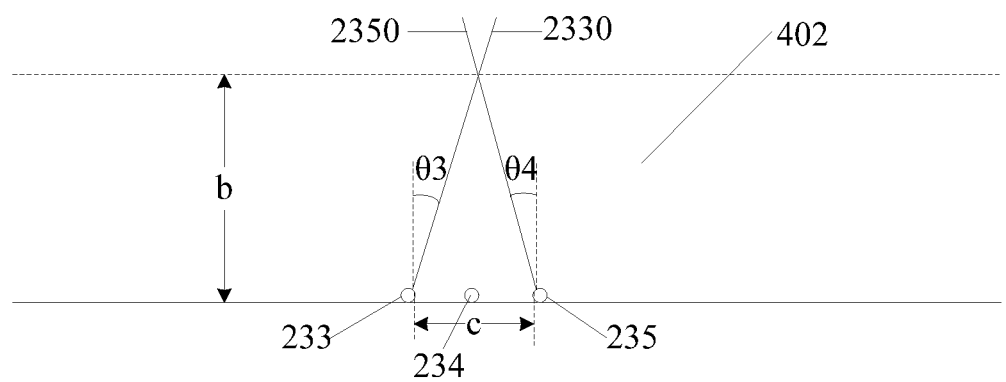
FIG. 7B is another schematic diagram illustrating a touch control insensitive area formed in a display device provided by an embodiment of the disclosure.

Preferably, in order to further ensure the effect of multi-touch, the distance b between the infrared emitting units 23 and the boundary line separating the fourth touch area 402 and the third touch area 401, as shown in FIG. 7B, further needs to meet the following:

$$b \geq (c * \tan \theta_3 * \tan \theta_4)/(\tan \theta_3 + \tan \theta_4).$$

As shown in FIG. 7B, the plurality of infrared emitting units 23 disposed horizontally include three adjacent infrared emitting units 233, 234 and 235, a spacing between the infrared emitting units 233 and 235 is a maximum separation distance c among all the infrared emitting units 23, and the separation distance is a distance between the two infrared emitting units separated by one infrared emitting unit. For the infrared emitting unit 233, an included angle between the outermost detection beam 2330) and the normal is an effective signal emitting angle $\theta_3$; and for the infrared emitting unit 235, an included angle between the outermost detection beam 2350) and the normal is an effective signal emitting angle $\theta_4$.

Specifically, the touch-insensitive area may be set as not for touch operation but only as display: or not for display, so the third touch area 401 may be at least partially located in the display area 101 of the display module 1, that is, the third touch area 401 and the display area 101 overlap, and may completely overlap or partially overlap. The protective cover plate 3 is provided with a shielding layer in an area corresponding to the fourth touch area 402, for example, a light shielding layer such as a black tape is used to shield the fourth touch area 402. The light shielding layer will lead to a wider frame of the display device, which is very unfavorable for realizing a narrow bezel design. In the display device provided by embodiments of the disclosure, the following solutions are proposed to solve the problem.

Figure 1E:
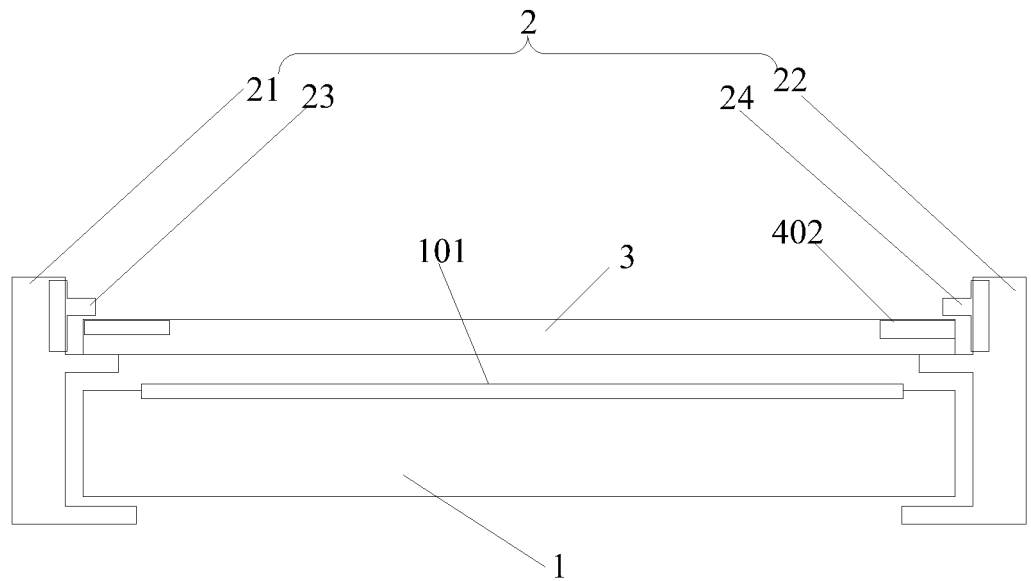
FIG. 1E is another schematic structural diagram illustrating a display device provided by an embodiment of the disclosure.
Figure 8A:
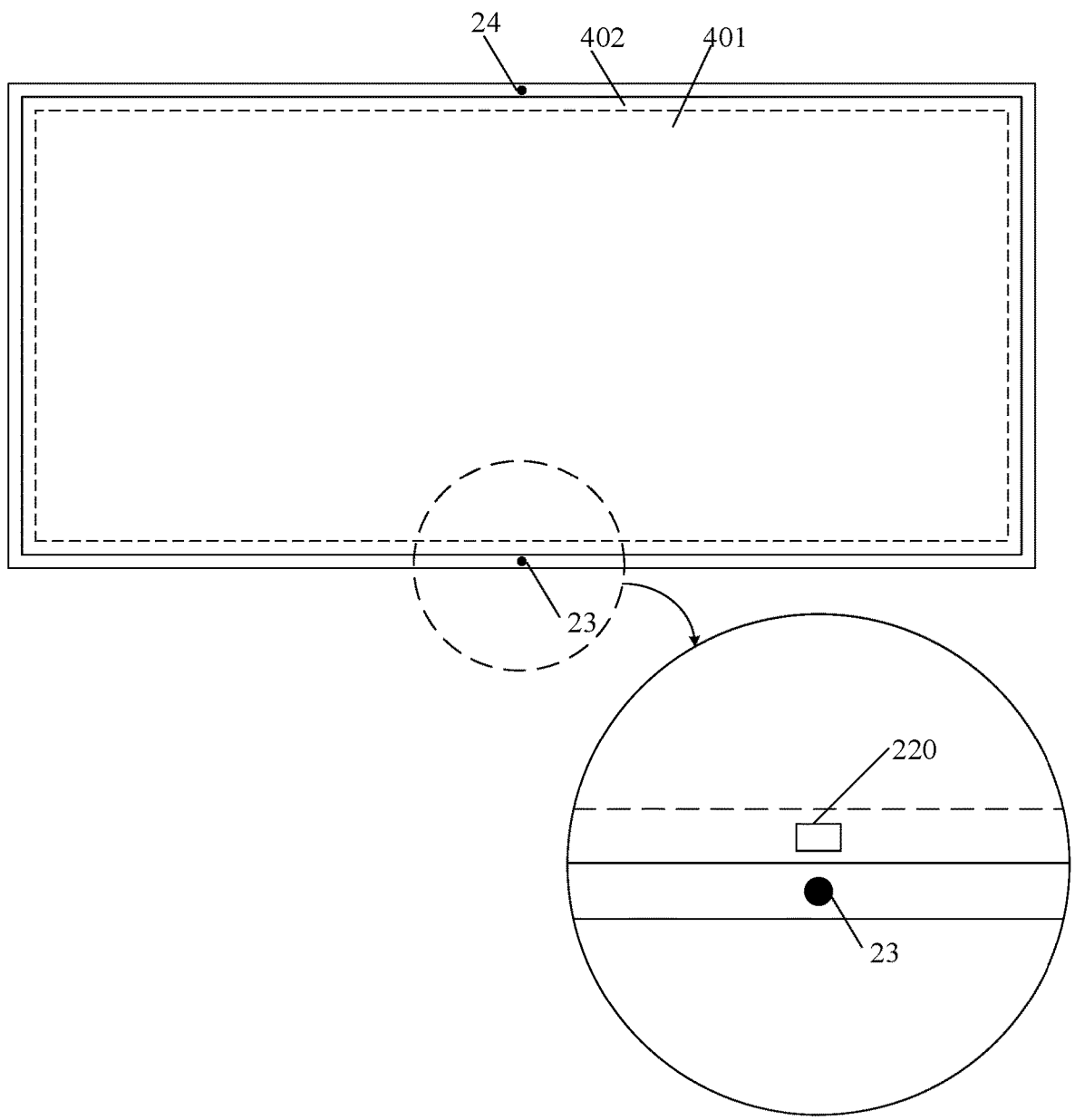
FIG. 8A is a schematic structural diagram illustrating a display device providing a second icon provided by an embodiment of the disclosure.
Figure 8B:
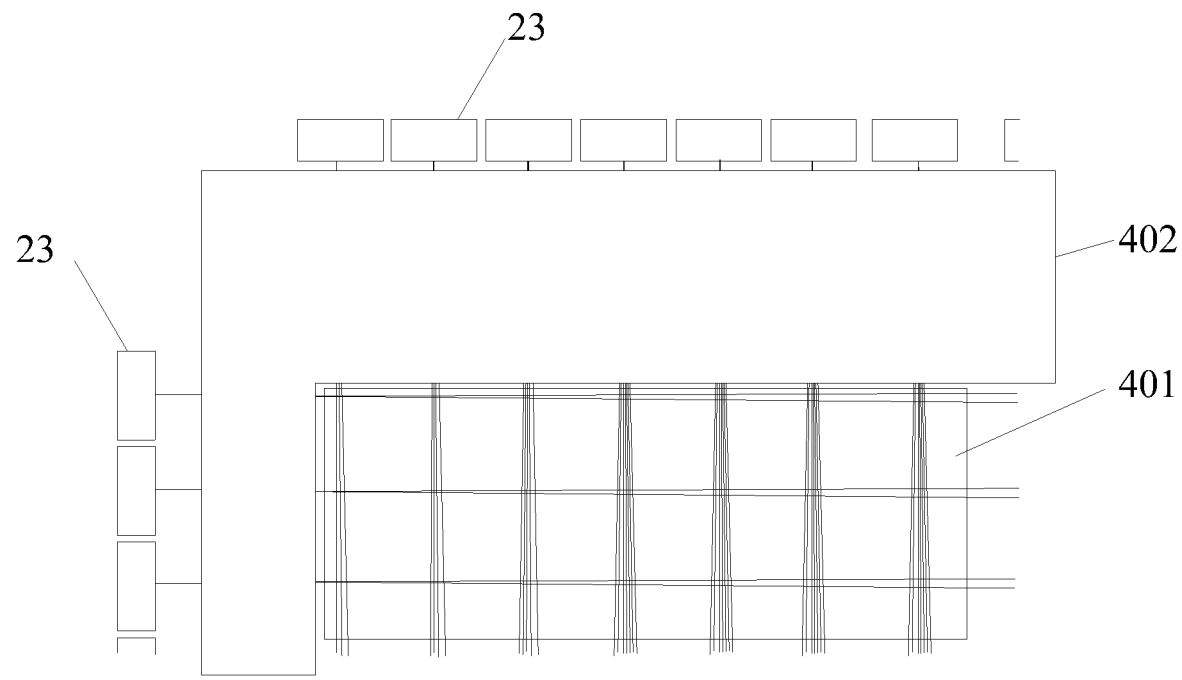
FIG. 8B is a schematic structural diagram illustrating a display device providing a fourth touch area provided by an embodiment of the disclosure.

In some embodiments, in the above display device provided by embodiments of the disclosure, as shown in FIG. 8A, touch areas formed on the surface of the display module 1 by effective infrared light signals emitted by all the infrared emitting units 23 are divided into the third touch area 401 and the fourth touch area 402. As shown in FIG. 1E, the third touch area 401 covers a central area of the display area 101 of the display module, and the fourth touch area 402 covers at least one edge area of the display area 101 of the display module 1. Specifically, according to the above explanation of the mechanism of generating the touch control insensitive area 501, it can be known that the infrared touch blind points will appear in an edge area where the infrared emitting units 23 and the infrared receiving units 24 are disposed. The edge areas of the display area 101 where the infrared emitting units 23 and the infrared emitting units 24 are arranged belong to the fourth touch area 401. In a case that the infrared emitting units 23 are distributed in the first infrared emitting frame 21a and the second infrared emitting frame 21b at the same time, it may be considered that the fourth touch area 402 is formed around the third touch area 401. It is worth noting that both the third touch area 401 and the fourth touch area 402 overlap with the display area 101. As shown in FIG. 8B, it may be considered that the third touch area 401 completely overlaps with the display area 101, and the fourth touch area 402 partially overlaps with the display area 101.

As shown in an enlarged view in FIG. 8A, the display module 1 displays at least one second icon 220 on at least one display interface in the area corresponding to the fourth touch area 401, and a display position of the second icon 220 corresponds to a position of the at least one infrared emitting unit 23 or infrared receiving unit 24. Specifically, the second icon 220 may be, for example, a menu icon on a main interface of the electronic whiteboard, and may also be function icons such as a writing pen and an eraser on an operation interface of the electronic whiteboard.

Specifically, in response to a starting operation of the user, the display module may start some programs. For example, in a conference machine product, the user may click to start the electronic whiteboard function, and the user may write or draw on the writing interface of the electronic whiteboard. In the product, the writing interface of the electronic whiteboard is located in the third touch area 401, so the user may write continuously and fluently in the writing interface. Some functional icons of the electronic whiteboard, such as at least one icon for a writing pen or an eraser, may be located in the fourth touch area 402.

Specifically, setting the second icon 220 in the fourth touch area 402 can effectively reduce the bezel of the display device, which is beneficial to the realization of narrow-bezel products. For some large-sized display devices, the user only performs frequent touch operations in the third touch area 401, which will not affect the operation experience of the user.

The following two solutions may be described to make the "corresponding" in "the display position of the second icon 220 corresponds to the position of at least one infrared emitting unit 23 or infrared receiving unit 24" definite.

In some embodiments, in the above display device provided by embodiments of the disclosure, a geometric center of the second icon 220 corresponds to a central position of the corresponding infrared emitting unit 23. It may be specifically understood that a line connecting the geometric center of the second icon 220 and the central position of the infrared emitting units 23 is parallel to the horizontal direction or the vertical direction. It should be noted that the corresponding mode is a substantially corresponding mode and cannot guarantee absolute corresponding.

In addition, for the one-to-many touch control mode, each infrared emitting unit 23 has one effective signal emitting angle. For one infrared emitting unit 23, the effective infrared light signal emitted within a certain angle can be received by the infrared receiving unit 24, so it may be used for infrared touch control recognition. Beyond the angle, the infrared light signal is seriously attenuated or not used for the system settings. Therefore, in some embodiments, in the above display device provided by embodiments of the disclosure. "the display position of the second icon 220 corresponds to the position of at least one infrared emitting unit 23 or infrared receiving unit 24" may be explained as that the geometric center of the second icon 220 is positioned within the effective signal emitting angle range of the corresponding infrared emitting unit 23.

Specifically, the second icon 220 may be disposed in the horizontal fourth touch area 402, and may also be disposed in the fourth touch area 402 in the vertical direction, or one or more second icons 402 may be disposed both in the horizontal and vertical fourth touch areas 402.

Only one infrared emitting unit 23 and one infrared receiving unit 24 are shown in FIG. 8A. It should be noted that an actual product may have the plurality of infrared emitting units 23 and the plurality of infrared receiving units 24. The display module I may also display the plurality of second icons 220, it only needs to ensure that the display position of each second icon 220 in the fourth touch area 402 corresponds to the position of at least one infrared emitting unit 23 or infrared receiving unit 24 in position.

In some embodiments, the above display device provided by embodiments of the disclosure may further include: a processor, wherein the processor is configured to receive a first operation of the user and control the display position of the second icon to move, and the display position of the second icon after movement corresponds to the position of the at least one infrared emitting unit. Specifically, in response to the first operation of the user, the position of the second icon 220 moves, and after movement, the display position of the second icon 220 still needs to correspond to the position of one infrared emitting unit 23, only the corresponding infrared emitting unit 23 is changed. For example, the first operation may be: receiving long-press click and drag operations of the user, and the position of the second icon 220 moves.

Specifically, in the one-to-many touch control mode, there will be a sixth touch area in a corner area of the third touch area 401, and the sixth touch area is not only related to the density of the infrared emitting units 23, but also is related to the position of the infrared emitting units 23. For example, for the one-to-seven touch control solution, the infrared light emitted by the infrared emitting units 23 located in the middle area can be received by the seven infrared receiving units 24, so there will be seven effective touch control light beams. However, for a corner area, for example, in a series of infrared emitting units 23, the infrared light emitted by one infrared emitting unit 23 located in the most corner area can only be received by four infrared receiving units 24, therefore, the effective touch light of the infrared emitting unit 23 located in the corner area is greatly reduced. Currently, in the related art, the touch control precision is generally improved by increasing the density of the infrared emitting (receiving) units 23 in the corner area, but the problem cannot be completely solved by merely increasing the density of the infrared emitting units 23. Therefore, in the display device, the sixth touch area is generally provided in the four corner areas.

Figure 9:
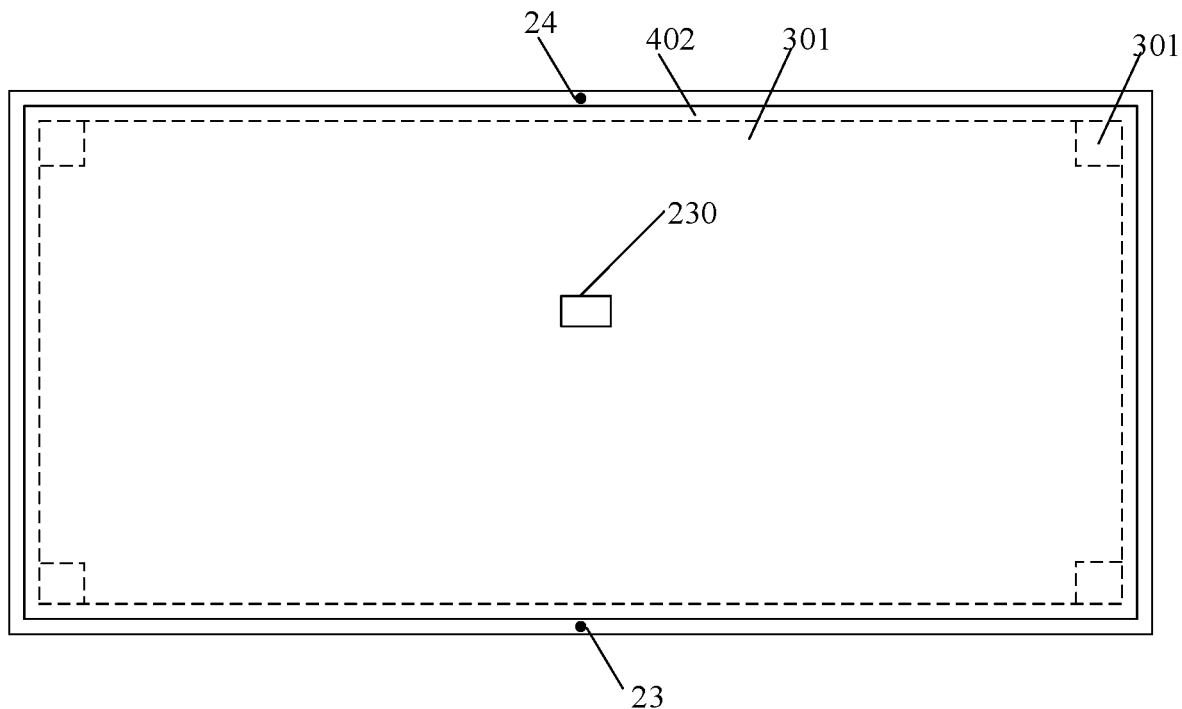
FIG. 9 is a schematic structural diagram illustrating a display device providing a third icon in provided by an embodiment of the disclosure.

Based on this, in the above display device provided by embodiments of the disclosure, as shown in FIG. 9, the third touch area 401 may include the sixth touch area 301 and a fifth touch area 302, touch control precision of the sixth touch area 301 is lower than touch control precision of the fifth touch area 302, and the sixth touch area 301 covers each corner area of the third touch area 301. Specifically, when designing the display product, a development engineer can learn the sixth touch area 301 according to parameters of the infrared touch assembly 2, such as the four corners. For another example, the sixth touch area 301 may also be a low-density area of the infrared emitting (receiving) units 23. The range of the sixth touch area 301 in the four corner areas may be determined by calculating a distance from a vertex angle, for example, along the edge of the display area of the display module, a distance within 5 cm of the vertex as the sixth touch area 301. The numerical range of the distance is not limited in the present embodiment, because the numerical range of the distance is closely related to the type and size of the infrared emitting units 23 and the setting of the infrared touch assembly.

In some embodiments, in the above display device provided by embodiments of the disclosure, as shown in FIG. 9, the display module I may control an area corresponding to the fifth touch area 302 to display at least one third icon 230 on at least one display interface. Limiting the position of the third icon 230 to the fifth touch area 302 may improve the convenience of the user operation. If the third icon 230 is displayed in the sixth touch area 301, it may cause that the third icon 230 may not be started accurately and quickly when the user clicks the third icon 230. Only one infrared emitting unit 23 and one infrared receiving unit 24 are shown in FIG. 9. It should be noted that an actual product may have the plurality of infrared emitting units 23 and the plurality of infrared receiving units 24. The display module I may also display the plurality of third icons 230, and the third icons 230 may meet the setting rules of the first icon 210 or the second icon 220 in the above solution.

Correspondingly: the processor of the display device is configured to receive a second operation of the user and control a display position of the third icon 230 to move in the display area following the second operation, and the display position of the third icon 230 after movement is positioned within a range where the fifth touch area 302 is located. Specifically, the position of the third icon 230 will be adjusted in response to the second operation of the user. For example, the position of the third icon 230 will move under dragging of the user. In the solution provided by embodiments of the disclosure, when the third icon 230 moves in response to a dragging operation of the user, the moving range of the third icon 230 is limited to the fifth touch area 302, that is, after the user completes the position adjustment operation of the third icon 230, the position of the third icon 230 finally displayed is within the fifth touch area 302. That is, when it is determined that the third icon 230) moves to the sixth touch area 301 when the user stops the second operation, the display position of the third icon 230 after movement is controlled to be positioned within the range of the fifth touch area 302. For example, when the user drags the third icon 230, the third icon 230 will move accordingly. When the user drags the third icon 230 to move to the sixth touch area 301, the third icon 230 will also move to the sixth touch area 301. But when the user stops dragging the third icon 230, for example, when the user lifts his/her hand, the third icon 230 will automatically go back to the high touch control precision area 302 for display, such as the middle area corresponding to the touch area, to ensure that the final display position of the third icon 230 is located in the high touch control precision area 302.

In some embodiments, in the above display device provided by embodiments of the disclosure, the display module I may further control to display at least one fixed image in the area corresponding to the sixth touch area 301 on at least one display interface, that is, the sixth touch area 301 is only used for display and does not display the third icon 230 used for interacting with the user, so as to improve utilization of the sixth touch area 301.

Specifically, the mechanism by which the above display device provided by embodiments of the disclosure realizes infrared touch control is as follows.

The display device includes an infrared controller, a microprocessing control drive circuit (i.e., a shift latch) in the infrared controller sequentially turns on the infrared emitting units, that is, only one infrared emitting unit is controlled to emit the infrared light at a certain time through a timing control circuit. Meanwhile, the corresponding infrared receiving unit is addressed through an address line and a data line, and the corresponding infrared receiving unit is controlled to receive the effective infrared light signal, and the received and sensed luminous flux is amplified and converted into a digital signal by an amplifier and an AD converter, which is then sent to a microprocessor for processing through wiring, thereby determining whether touch occurs.

When the user touches a screen, a finger will block the infrared light passing through the horizontal and vertical directions of the position. The change of the light signal causes an electrical signal output by a photoelectric detection circuit to change. When the microprocessor scans and checks, it will find the blocked infrared light and determine that there may be a touch. After scanning all the infrared signals of an X axis, it switches to a Y axis for scanning, and starts the corresponding infrared emitting unit and infrared receiving unit. If it is found that infrared rays are also blocked on the Y axis, it means that the touch is found, and the positions of the infrared receiving unit and the infrared emitting unit corresponding to the blocked light on the two axes are reported to a host, and the position of a touch point on the screen is determined through calculation. The scanning of each frame starts from the first infrared emitting unit of the X axis to the last infrared emitting unit of the X axis, and then starts from the first infrared emitting unit of the Y axis to the last infrared emitting unit of the Y axis. Any touch object that is opaque to the infrared light can block the infrared rays to realize touch positioning.

The above is just a general mechanism, which is not limited by the present disclosure. Hardware of the infrared touch control is introduced below.

An infrared touch control system is divided into an emitting board and a receiving board. For example, the emitting board mainly includes a slave control module, an infrared emitting module, a digital-to-analog conversion module, an inter-board cascade module, a data buffer module and a power supply module. For example, the receiving board mainly includes a master control module, a slave control module, an infrared receiving module, a digital-to-analog conversion module, an inter-board cascade module, a data buffer module and a power supply module.

In order to realize infrared touch control recognition, the display device generally includes an infrared control module, such as an infrared control chip. The infrared control module generally further includes a mater control module and a slave control module. The main tasks are three major functions of system mode control, logic control of emitting and receiving channel selection, and coordinate calculation of shielding points. Generally, the master control module completes the two functions of system mode control and coordinate calculation of the shielding point, and the slave control module completes the logic control of the emitting and receiving channel selection.

The master control module, for example, may be composed of an ARM chip STM32F103T8U6 processor and its peripheral circuits, which can provide clock signals and synchronization signals for the touch control system. The mainly realized functions include the following.

1. A system mode control: different working modes are selected and switched.

2. The slave control chip is controlled through a communication protocol (such as SPI protocol), infrared emitting unit and receiving unit array codes are stored, instructions are sent to the slave control chip, and the certain emitting unit is lightened or the certain receiving unit is gated.

3. The infrared control module generally further includes an analog-to-digital conversion module, and the master control module further receives the converted data from the analog-to-digital conversion module, and calculates coordinates of the shielding points.

4. The clock signals and synchronization signals are provided for the slave control module.

5. Communicate with an upper computer through a certain communication protocol (such as USB protocol) to transmit the coordinates of the shielding points.

The slave control module, for example, may be composed of an FOPGA chip and its peripheral circuits. The slave control module exists on each emitting board and receiving board, and its specific functions may be divided into the following aspects.

An instruction signal sent by a master control chip is received and decoded, and the address code is verified. If verification is successful, an operation is executed according to an instruction command. If the verification is not successful, an SPI signal is sent to the next board through an inter-board data interface.

On the emitting board, according to the decoded SPI instruction, a gating signal is provided for an infrared emitting tube drive chip TLC59025 to realize turning on or off of an infrared emitting tube channel.

On the receiving board, according to the decoded SPI instruction, a gating signal is provided for the infrared receiving tube gating chip 74LV4051 to realize turning on or off of an infrared receiving tube channel.

On the receiving board, a clock signal and an enable signal are provided for an A/D conversion chip.

Infrared receiving module: the infrared receiving module may include an infrared receiving unit (such as an infrared receiving tube) and a channel selection switch (such as a shift register). After the infrared receiving tube receives the light, a current signal is obtained, a voltage signal is obtained through a load resistance, the obtained voltage signal is sent to the channel selection switch, and the channel selection module may realize gating of the signal.

Digital-to-analog conversion module: after the infrared receiving tube receives the light, the current signal is generally obtained, and may be converted into the voltage signal through the load resistance. The current voltage is an analog signal, which will pass through the digital-to-analog conversion module to obtain a digital signal, and the digital signal is sent to the master control module, for example, the digital-to-analog conversion module is AD9203.

In some embodiments, the infrared touch control system further includes a data buffer module, a power supply module and the like.

In an actual touch operation, as mentioned above, different manufacturers may adopt different scanning modes, such as a one-to-one scanning mode, or a one-to-many scanning mode.

For the realization of multi-touch, the one-to-many scanning mode must be adopted.

In one scan cycle, the hardware-based scanning mode also has the following three solutions.

(1) Full-screen serial sequential scanning: after one infrared emitting unit is turned on, the plurality of receiving units corresponding to it are turned on one by one.

(2) Full-screen serial interval scan: for all the emitting units, firstly all scanning in one direction is completed, and then scanning in the other direction is completed, thus completing scanning in all the directions in turn.

In addition, there is a mode of tracking scanning, which is not described in detail here. The above content is the basic hardware and touch control realization method of the infrared touch control system. Finally, the master control module will send the coordinates of the shielding points to the upper computer. For example, data transmission between the upper computer (such as a PC host) and the HID may be realized through the USB/HID protocol, of course, the upper computer also needs to load or install the corresponding driving program to communicate with the infrared touch control system.

After the upper computer obtains coordinate data of the shielding points, a first image of a candidate touch point is generated. However, due to discreteness of an infrared light path, interference of ambient light, and the hardware problems, there will be more noisy points. Therefore, the upper computer further needs to perform a series of processing on the first image, such as smooth denoising, image segmentation, ghost focus removal, and touch point positioning. After touch point positioning is obtained, operations such as clicking the icon, and writing on the electronic whiteboard can be further realized.

Specifically: in the above display device provided by embodiments of the disclosure, due to uneven distribution density of the infrared emitting units in the infrared emitting frame, the touch control precision in the touch area is different, for example, the touch control precision of the first touch area and the second touch area is high, and the touch precision of other areas is low. The area with the high distribution density of the infrared emitting units such as the first touch area and the second touch area may be called a seventh touch area, and a touch area formed on the surface of the display module by the area with the low distribution density of the infrared emitting units is called an eighth touch area.

Since display precision of the display modules under the different touch control precisions is the same, under the same touch control scanning frequency and display scanning frequency: when line is continuously drawn in the display area of the display module, a problem that a display trajectory cannot follow the picture in time when crossing the different touch control precision areas because the drawing speed is the same but the increment speed of the displayed graphics is different is generated.

Based on this, in the above display device provided by embodiments of the disclosure, when it is determined that a signal received by the infrared receiving units is to draw a local continuous line shape, an incremental change length of a displayed line segment in the eighth touch area may be controlled to be $\Delta L1$, an incremental change length of a displayed line segment in the seventh touch area is controlled to be $\Delta L2$, and $\Delta L1$ and $\Delta L2$ are adjusted to be $\Delta L1 > \Delta L2$ to ensure that the drawn line shape trajectory quickly follows the movement trajectory of the touch point in the different touch control precision areas.

Figure 10:
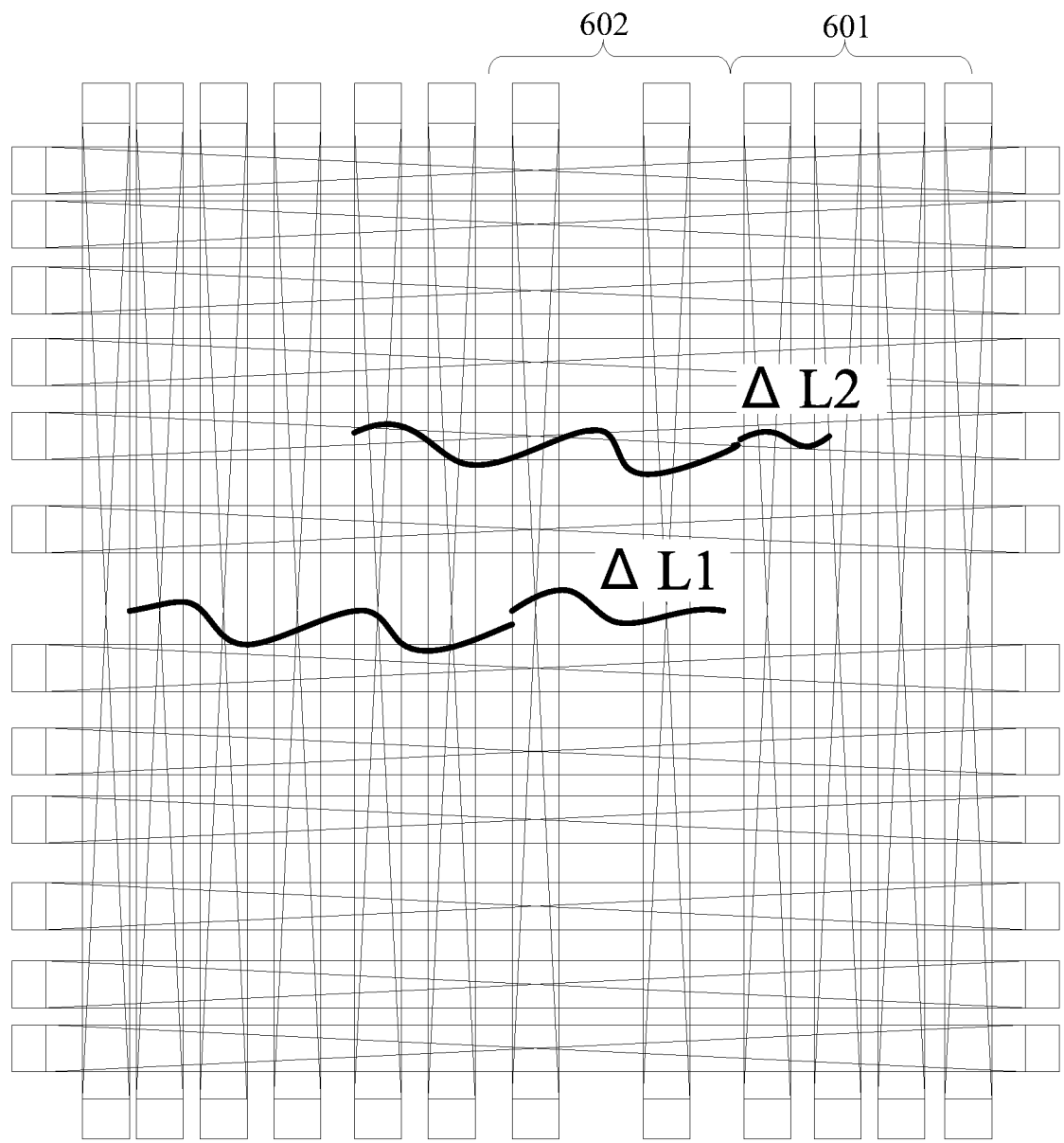
FIG. 10 is a schematic diagram illustrating the drawing of a continuous graphics in a display device provided by an embodiment of the disclosure.

Specifically, as shown in FIG. 10, when the wiring trend of the continuously drawn line shape is approximately parallel to the bezel (a long side or a short side) of the display module, in a process that the user draws the continuous graphics at the same drawing speed, the incremental change length $\Delta L1$ of the drawn line segment of the display module when a starting point of the operation of continuously drawing the line shape is in the area 602 with the low touch control precision is greater than the incremental change length $\Delta L2$ of the drawn line segment of the display module when the starting point of the continuously drawn line shape is in the area 601 with the high touch control precision.

Figure 11:
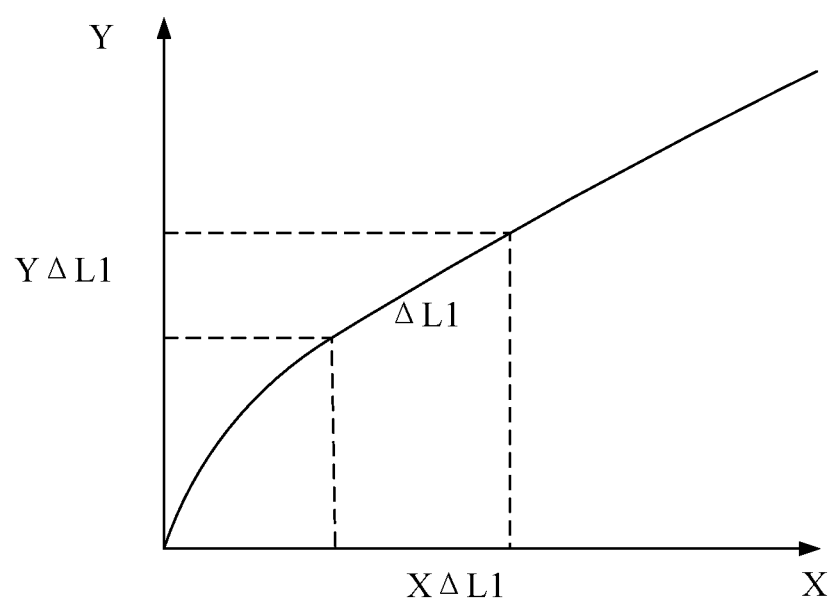
FIG. 11 is a schematic diagram of a vertical component for drawing a continuous graphics in a display device provided by an embodiment of the disclosure.

Specifically, when there is a certain included angle between the wiring trend of the continuously drawn line shape and the bezel of the display module, in a process of drawing touch points at the same moving speed to generate the continuously drawn line shape, in the area with the low touch control precision, a vertical component of the length $\Delta L1$ of each growth of the picture graphics in the long side direction is $X\Delta L1$, a vertical component in the short side direction is $Y\Delta L1$, and $X\Delta L1*X\Delta L1 + Y\Delta L1*Y\Delta L1 = \Delta L1*\Delta L1$, as shown in FIG. 11. In the area with the high touch control precision, a vertical component of the length $\Delta L2$ of each growth of the picture graphics in the long side direction is $X\Delta L2$, a vertical component in the short side direction is $Y\Delta L2$, and $X\Delta L2*X\Delta L2 + Y\Delta L2*Y\Delta L2 = \Delta L2*\Delta L2$.

Further, a specific numerical proportional relationship between $\Delta L1$ and $\Delta L2$ may be set as follows: in the seventh touch area, one line segment growth is displayed every X1 frames of images, and a length of each growth is $\Delta L3$, namely. $\Delta L3 = \Delta L2$; and in the eighth touch area, one line segment growth is displayed every X2 frames of images, and a length of each growth is $(X2/X1)*\Delta L3 = \Delta L1$, where X2 is greater than X1.

Specifically, when the wiring trend of the continuously drawn line shape is approximately parallel to the bezel of the display module, in the process of drawing the contact point at the same moving speed to generate the continuously drawn line shape, in the area with the high touch control precision, one growth is displayed every X1 frames of images, and a length of each growth is $\Delta L3$; and in the area with the low touch control precision, one growth is displayed every X2 frames of images, and a length of each growth is $(X2/X1)*\Delta L3$, where X2 is greater than X1. Specifically, both X1 and X2 are positively related to the spacing between the infrared emitting units at their corresponding positions.

Specifically, when there is a certain included angle between the wiring trend of the continuously drawn line shape and the bezel of the display module, in the process of drawing the touch point at the same moving speed to generate the continuously drawn line shape, in the area with the high touch control precision, a vertical component of the length $\Delta L3$ of each growth of the picture graphics in the long side direction is $X\Delta L3$, a vertical component in the short side direction is $Y\Delta L3$, and $X\Delta L3*X\Delta L3 + Y\Delta L3*Y\Delta L3 = \Delta L3*\Delta L3$. In the area with the low touch control precision, a vertical component of the length of each growth of the picture graphics in the long side direction is X2/X1*XΔL3, and a vertical component in the short side direction is X2/X1*YΔL3.

Specifically, in the above mentioned display device provided by embodiments of the disclosure, a scanning frequency of the infrared touch assembly is H1, a frequency of feedback data output by the infrared touch assembly is H2, a display frequency of video data of the display module is H3, and the frequency H2 is generally lower than the frequency H1, while the scanning frequency H1 is generally less than the frequency H3.

In some embodiments, in the above display device provided by embodiments of the disclosure, an effective feedback time interval of touch control data corresponding to the seventh touch area is T1, and a feedback time interval of touch control data corresponding to the eighth touch area is T2, where T1/T2 is positively correlated with ΔL1/ΔL2. Specifically, the effective feedback time refers to a time from the time when displacement of a touch operation changes to the time when a position of the touch control recognition point changes.

Specifically, when scanning is performed at the same scanning frequency H1, and when the wiring trend of the continuously drawn line shape is approximately parallel to the bezel of the display module, in the process of drawing the touch point at the same moving speed to generate the continuously drawn line shape, in the area with the high touch control precision, a time interval for moving from the previous point to the next point in the touch control feedback data is T1, and the incremental change length of the displayed line segment of the display module is ΔL2; and in the area with the low touch control precision, a time interval for moving from the previous point to the next point in the touch control feedback data is T2, and the incremental change length of the displayed line segment of the display module is ΔL1. T1/T2 is positively correlated with ΔL1/ΔL2, and both ΔL1 and ΔL2 are negatively correlated with H3.

Specifically, when scanning is performed at the same scanning frequency H1, and when there is the certain included angle between the wiring trend of the continuously drawn line shape and the bezel of the display module, in the process of drawing the touch point at the same moving speed to generate the continuously drawn line shape, in the area with the high touch control precision, the time interval for moving from the previous point to the next point in the touch control feedback data is T1, a vertical component of the incremental change length ΔL2 of the displayed line segment of the display module in the long side direction is XΔL2, and a vertical component in the short side direction is YΔL2; and in the area with the low touch control precision, the time interval for moving from the previous point to the next point in the touch control feedback data is T2, a vertical component of the incremental change length ΔL1 of the displayed line segment of the display module in the long side direction is XΔL1, and a vertical component in the short side direction is YΔL1. T1/T2 is positively correlated with XΔL1/XΔL2, and T1/T2 is positively correlated with YΔL1/YΔL2.

The above display device provided by embodiments of the disclosure includes the display module and the infrared touch assembly, where the display surface of the display module is in the shape of the rectangle with the edge extending in the first direction and the edge extending in the second direction, and the first direction and the second direction are perpendicular to each other; the infrared touch assembly includes the infrared emitting frame and the infrared receiving frame which are disposed oppositely and extend in the first direction: the plurality of infrared emitting units are fixed in the infrared emitting frame: the plurality of infrared receiving units are fixed in the infrared receiving frame; and the orthographic projection of the light-emitting surface of the infrared emitting frame in the display module is located in the area outside the display area of the display module. The infrared emitting units with the uneven distribution density are disposed in the infrared emitting frame, such that not only is the conventional touch operation realized, but also, the cost of the infrared touch assembly is reduced, and the cost of the display device is accordingly reduced.

Based on the same inventive concept, an embodiment of the disclosure further provides another display device, including: a display module and an infrared touch assembly.

The infrared touch assembly includes an infrared emitting frame and an infrared receiving frame, a plurality of infrared emitting units are fixed in the infrared emitting frame, and a plurality of infrared receiving units are fixed in the infrared receiving frame.

One infrared emitting unit corresponds to the plurality of infrared receiving units, and an effective infrared light signal emitted by one infrared emitting unit is simultaneously received by the plurality of corresponding infrared receiving units.

Touch areas formed on a surface of the display module by effective infrared light signals emitted by all the infrared emitting units are divided into a third touch area and a fourth touch area, and touch control precision of the third touch area is higher than touch control precision of the fourth touch area; and the third touch area is located in a central area of the touch area, and the fourth touch area is located in at least one edge area of the touch area.

The display module displays at least one second icon on at least one display interface in an area corresponding to the fourth touch area.

A display position of the second icon corresponds to a position of the at least one infrared emitting unit or infrared receiving unit.

Specifically, the following two solutions may describe what "corresponding" in "the display position of the second icon corresponds to the position of at least one infrared emitting unit or infrared receiving unit" is.

The first solution: a geometric center of the second icon corresponds to a central position of the corresponding infrared emitting unit. It may be specifically understood that a line connecting the geometric center of the second icon and the central position of the infrared emitting units is parallel to the horizontal direction or the vertical direction. It should be noted that the corresponding mode is roughly corresponding and cannot guarantee strict corresponding.

Because the one-to-many touch control mode, each infrared emitting unit has one effective signal emitting angle. For one infrared emitting unit, the effective infrared light signal emitted within a certain angle can be received by the infrared receiving unit, so it may be used for infrared touch control recognition. Beyond the angle, the infrared light signal is seriously attenuated or the system settings do not use it. Therefore, "corresponding" may be explained as that the geometric center of the second icon is positioned within the effective signal emitting angle range of the corresponding infrared emitting unit.

Specifically, the second icon may be disposed in the horizontal fourth touch area, and may also be disposed in the fourth touch area in the vertical direction, or one or more second icons may be disposed both in the horizontal and vertical fourth touch areas.

For the specific parameters of the third touch area and the fourth touch area, as well as other specific setting rules of the second icon, reference may be made to the display device in the previous embodiment, which is not described in detail here.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A display device, comprising: a display module and an infrared touch assembly; wherein
   a display surface of the display module is in a shape of rectangle with an edge extending in a first direction and an edge extending in a second direction, and the first direction and the second direction are perpendicular to each other;
   the infrared touch assembly comprises an infrared emitting frame and an infrared receiving frame which are disposed oppositely and extend in the first direction, a plurality of infrared emitting units are fixed in the infrared emitting frame, and a plurality of infrared receiving units are fixed in the infrared receiving frame;
   an orthographic projection of a light-emitting surface of the infrared emitting frame in the display module is located in an area outside a display area of the display module; and
   a distribution density of the plurality of infrared emitting units in the infrared emitting frame is uneven;
   wherein the infrared emitting frame comprises a first area and a second area, and a distribution density of infrared emitting units in the first area is greater than a distribution density of infrared emitting units in the second area;
   wherein the plurality of infrared emitting units have a sequence number from 1 to N, the first area is a middle area of the infrared emitting frame, the infrared emitting units in the first area are arranged at different intervals, and the second area is an area adjacent to the first area in the infrared emitting frame;
   a distance between an infrared emitting unit numbered 1 and an infrared emitting unit numbered N is a third distance;
   a distance between a center point between two infrared emitting units with a minimum spacing in the first area and the infrared emitting unit numbered 1 is a fourth distance; and
   a ratio between the fourth distance and the third distance is a third ratio, and the third ratio is a 0.38 less then 0.62.

2. The display device according to claim 1, wherein the infrared touch assembly further comprises: an infrared emitting frame and an infrared receiving frame which are disposed oppositely and extend in the second direction.

3. The display device according to claim 1, wherein the plurality of infrared emitting units have a sequence number from 1 to N, the first area is a middle area of the infrared emitting frame, and n-m infrared emitting units with a sequence number from m to n are arranged in the first area at equal intervals; and N>n>m;
   a distance between an infrared emitting unit numbered m and an infrared emitting unit numbered 1 is a first distance;
   a distance between an infrared emitting unit numbered n and an infrared emitting unit numbered N is a second distance;
   a distance between the infrared emitting unit numbered 1 and the infrared emitting unit numbered N is a third distance;
   a ratio between the first distance and the third distance is a first ratio, and the first ratio is greater than 0.35 and less than 0.5; and
   a ratio between the second distance and the third distance is a second ratio, and the second ratio is greater than 0.35 and less than 0.5.

4. The display device according to claim 1, wherein a diameter of one infrared emitting unit is 0.4 mm-0.6 mm;
   a spacing between two adjacent infrared emitting units in the first area is 2 mm-7 mm; and
   a spacing between two adjacent infrared emitting units in the second area is 5 mm-16 mm.

5. The display device according to claim 1, wherein an effective infrared light signal emitted by the infrared emitting units in the first area of the infrared emitting frame extending in the first direction creates a first touch area on a surface of the display module;
   the display module displays at least one first icon on at least one display interface in an area corresponding to the first touch area; and
   at least one of the plurality of infrared emitting units is disposed within a range including an orthographic projection of the at least one first icon in a direction parallel to a side edge where the first area is located.

6. The display device according to claim 5, wherein an effective infrared light signal emitted by infrared emitting units in a first area of an infrared emitting frame extending in the second direction creates a second touch area on the surface of the display module;
   there is a touch control overlapping area between the second touch area and the first touch area, and the display module displays the at least one first icon in an area corresponding to the touch control overlapping area; and
   the at least one of the plurality of infrared emitting units is disposed within the range including the orthographic projection of the at least one first icon in the direction parallel to the side edge where the first area is located.

7. The display device according to claim 1, wherein the plurality of infrared emitting units and the plurality of infrared receiving units are in one-to-one correspondence, and an effective infrared light signal emitted by one of the plurality of infrared emitting units is received by one of the plurality of infrared receiving units.

8. The display device according to claim 1, wherein one infrared emitting unit corresponds to multiple infrared receiving units among the plurality of infrared receiving units, and an effective infrared light signal emitted by one infrared emitting unit is simultaneously received by the corresponding multiple infrared receiving units.

9. The display device according to claim 8, wherein the display module comprises a display panel and a protective cover plate;
   touch areas on a surface of the protective cover plate created by effective infrared light signals emitted by all the plurality of infrared emitting units are divided into a third touch area and a fourth touch area, and touch control precision of the third touch area is higher than touch control precision of the fourth touch area; and the third touch area is located in a central area of the protective cover plate, and the fourth touch area is located in at least one edge area of the protective cover plate.

10. The display device according to claim 9, wherein the third touch area covers a central area of the display area of the display module, and the fourth touch area covers at least one edge area of the display area of the display module; or wherein the third touch area is at least partially located in the display area of the display module, and the protective cover plate is provided with a shielding layer in an area corresponding to the fourth touch area.

11. The display device according to claim 10, wherein the display module displays at least one second icon on at least one display interface in an area corresponding to the fourth touch area; and a display position of the at least one second icon corresponds to a position of at least one of the plurality of infrared emitting units or at least one plurality of infrared receiving units.

12. The display device according to claim 11, wherein a geometric center of the at least one second icon corresponds to a central position of the corresponding infrared emitting unit; or wherein a geometric center of the at least one second icon is positioned within an effective signal emitting angle range of the corresponding infrared emitting unit.

13. The display device according to claim 10, wherein a distance b between the infrared emitting units and a boundary line separating the fourth touch area and the third touch area meets a following formula:

$$b \geq (a * \tan \theta_1 * \tan \theta_2)/(\tan \theta_1 + \tan \theta_2);$$

wherein, a is a maximum spacing between two adjacent infrared emitting units, and $\theta_1$ and $\theta_2$ are respectively effective signal emitting angles of the two adjacent infrared emitting units with the maximum spacing.

14. The display device according to claim 10, wherein the display device is a multi-touch display device, and a distance b between the infrared emitting units and a boundary line separating the fourth touch area and the third touch area meets a following formula:

$$b \geq (c * \tan \theta_3 * \tan \theta_4)/(\tan \theta_3 + \tan \theta_4);$$

where, a distance between two infrared emitting units separated by one infrared emitting unit is a separation distance, c is a maximum separation distance among all the separation distances, and $\theta_3$ and $\theta_4$ are effective signal emitting angles of two infrared emitting units with the maximum separation distance respectively.

15. The display device according to claim 10, wherein a diameter of one infrared emitting unit is 0.4 mm-0.6 mm; and a spacing between two adjacent infrared emitting units is 1 mm-16 mm.

16. The display device according to claim 9, wherein the third touch area is at least partially located in the display area of the display module, the third touch area comprises a fifth touch area and a sixth touch area, a touch control precision of the sixth touch area is lower than a touch control precision of the fifth touch area, and the sixth touch area covers each corner area of the third touch area;

the display module displays at least one third icon on at least one display interface in an area corresponding to the fifth touch area; and the display device further comprises: a processor, wherein the processor is configured to receive a command of a second operation from a user and control a display position of the at least one third icon to move in the display area following the second operation, and a display position of the at least one third icon after movement is positioned within a range where the fifth touch area is located.

17. The display device according to claim 16, wherein the processor is configured to, in response to determining that the at least one third icon moves to the sixth touch area when the user stops the second operation, control the display position of the at least one third icon after movement to be positioned within the range where the fifth touch area is located.

* * * * *